(12) United States Patent
Oguchi

(10) Patent No.: US 7,391,782 B2
(45) Date of Patent: Jun. 24, 2008

(54) PACKET RELAYING APPARATUS AND RELAYING METHOD WITH NEXT RELAYING ADDRESS COLLATION

(75) Inventor: Naoki Oguchi, Kodaira (JP)

(73) Assignee: Fujitsu Limited, Kawasaki (JP)

( * ) Notice: Subject to any disclaimer, the term of this patent is extended or adjusted under 35 U.S.C. 154(b) by 804 days.

(21) Appl. No.: 10/090,862

(22) Filed: Mar. 5, 2002

(65) Prior Publication Data

US 2002/0126667 A1    Sep. 12, 2002

(30) Foreign Application Priority Data

Mar. 6, 2001    (JP)    ............... 2001-062685

(51) Int. Cl.
    *H04L 12/28* (2006.01)
(52) U.S. Cl. ...................................... 370/400
(58) Field of Classification Search ............... 370/392, 370/389, 352, 395.63, 398–401, 465–477, 370/521, 349, 402, 428, 410, 351, 411; 709/247, 709/216, 217, 246, 223–225, 230, 238
    See application file for complete search history.

(56) References Cited

U.S. PATENT DOCUMENTS 6,079,020 A * 6/2000 Liu ............................. 726/15
6,154,839 A * 11/2000 Arrow et al. ................. 713/154
6,618,397 B1 * 9/2003 Huang ........................ 370/474
6,751,220 B1 * 6/2004 Li ............................... 370/390
6,993,026 B1 * 1/2006 Baum et al. ................. 370/392

FOREIGN PATENT DOCUMENTS

| JP | 06-284187 | | 10/1994 |
| JP | 06284187 A | * | 10/1994 |
| JP | 10-070566 | | 3/1998 |
| JP | 10070566 A | * | 3/1998 |
| JP | 2000-059357 | | 2/2000 |
| JP | 2000059357 A | * | 2/2000 |
| JP | 2000-244495 | | 9/2000 |
| JP | 2000244495 A | * | 9/2000 |

* cited by examiner

*Primary Examiner*—Dmitry Levitan
(74) *Attorney, Agent, or Firm*—Katten Muchin Rosenman LLP

(57) ABSTRACT

A packet relaying apparatus is structured to comprise a network relaying function for selecting one or more networks allowed to relay an received packet based on the transmission source network identifier corresponding to the received packet, a domain relaying function for selecting one or more routing domains corresponding to one or more networks, a routing information management function for collating the transmission destination address of the packet with each routing domain information of one or more routing domains to select the next hop router address for transmitting the packet to the next packet relaying apparatus, and a packet relaying function for transmitting the packet to the transmission destination address.

21 Claims, 21 Drawing Sheets

| RECEIVING INTERFACE | SOURCE DOMAIN | SOURCE VPN |
|---|---|---|
| IF#0 | DOMAIN#2 | VPN#1 |
| IF#1 | DOMAIN#1 | VPN#1 |
| IF#2 | DOMAIN#4 | VPN#3 |

FIG. 18

| REFERENCE ORDER / RECEIVING VPN | FIRST | SECOND |
|---|---|---|
| VPN#1 | VPN#1 PERMIT | |
| VPN#2 | VPN#2 PERMIT | VPN#1 PERMIT |
| VPN#3 | VPN#3 PERMIT | VPN#1 192.172.10.0 DENY |

FIG. 19

| DESTINATION VPN / REFERENCE ORDER | FIRST | SECOND | ... |
|---|---|---|---|
| VPN#1 | DOMAIN #1 PERMIT | DOMAIN #2 PERMIT | |
| VPN#2 | DOMAIN #2 PERMIT | DOMAIN #3 PERMIT | |
| VPN#3 | DOMAIN #4 PERMIT | | |

FIG. 20

| DESTINATION | MASK | OUTPUT INTERFACE | NEXT HOP ROUTER |
|---|---|---|---|
| 10.25.20.0 | 255.255.255.0 | IF1 | 10.25.20.1 |
| 10.25.50.0 | 255.255.255.0 | IF1 | 10.25.50.1 |
| 10.25.100.0 | 255.255.255.0 | IF11 | 192.168.254.3 |

FIG. 21

| DESTINATION | MASK | OUTPUT INTERFACE | NEXT HOP ROUTER |
|---|---|---|---|
| 192.168.30.0 | 255.255.255.0 | IF0 | 192.168.30.0 |
| 192.168.100.0 | 255.255.255.0 | IF10 | 192.168.254.3 |
| 192.168.110.0 | 255.255.255.0 | IF10 | 192.168.254.3 |

FIG. 22

| DESTINATION | MASK | OUTPUT INTERFACE | NEXT HOP ROUTER |
|---|---|---|---|
| 192.172.100.0 | 255.255.255.0 | IF12 | 192.168.254.3 |
| 192.172.110.0 | 255.255.255.0 | IF12 | 192.168.254.3 |
| 192.172.120.0 | 255.255.255.0 | IF2 | 192.172.120.1 |

FIG. 23

PACKET RELAYING APPARATUS AND RELAYING METHOD WITH NEXT RELAYING ADDRESS COLLATION

BACKGROUND OF THE INVENTION

1. Field of the Invention

The present invention relates to a packet relaying apparatus and a packet relaying method for providing communication services and more particularly to a packet relaying apparatus and a packet relaying method for relaying of packets among virtual private networks and routing domains.

2. Description of the Related Art

In recent years, with the rapid spread of the Internet, a user (for example, a company or university or the like) can realize communications with each dispersed branch or campus without the use of any virtual path/virtual channel by means of ATM (Asynchronous Transfer Mode) and/or FR (Frame Rely). In this communication, a VPN is sometimes formed. Thereafter, VPN will sometimes be called a virtual private network.

A certain user individually assigns IP addresses for operations only within the network of the user. When private IP addresses are used within such a user network, it is impossible to transmit the packets having the private IP addresses directly to the Internet which has global IP addresses.

This is because private IP addresses and global IP address would overlap on the Internet and thereby it would probably disable normal communication through the Internet.

Therefore, on the occasion of providing communications among respective sites of the private network of such a user, a system will be required in which capsulation (tunneling) with an IP packet having the global IP address, for example, is conducted for the transfer of the IP packet to the Internet in the case of connection to the Internet from the private network within this user. The capsulated packet is received and simultaneously decapsulated in the Internet network connection router of the site in the receiving side and the routing is executed to the destination host within the site at the receiving side.

In this case, a user is requested to install an apparatus for tunneling (capsulation in the transmitting side and decapsulation in the receiving side) the IP packet having the private IP address with the global IP address. Namely, introduction of a new apparatus is necessary.

Moreover, since the processes of capsulation and decapsulation are newly required, there is a possibility for deterioration of performance. In the following explanation, a relaying apparatus will be described as a router in some cases.

Moreover, when a user connects each site to the Internet, the routing control and setting of logical interfaces or the like are more complicated in the router of each site with an increase in the number of combinations of the settings among respective sites. In this case, there arises a problem that much cost will be required for introduction/maintenance and management of the network apparatuses and training of persons in charge of network management.

Therefore, in the case where a user introduces a VPN ("Virtual Private Network") for providing communications with each site via the Internet, a user can receive provisioned VPN services without any modification of an existing network by entrusting (outsourcing) introduction/maintenance and management of the VPN to a provider (including a carrier in the present invention).

In this VPN service, the tunneling starting/ending functions are realized with a router of the provider. When a certain user has a plurality of sites, the router of the provider comprises a routing control function for each user to determine which network of the destination user site to which the IP packet, received from the user site of the transmission source, should be transmitted through the encapsulation.

This function is provided with a router in the provider through the outsourcing. When the VPN service is available by the provider as explained above, the edge router of the provider transfers the IP packet with the intrinsic routing control function of the user network in separation from the routing control function of the Internet network.

Therefore, for the provider setting of the VPN service provided with the provider is very complicated because independent management of the routing control function is required for each site network of each user.

In some cases, a user can structure the VPN through the Internet but here explanation will be made under the precondition that the provider structures VPN to provide the VPN service to users. From the point of view of the owner of a network, the network in which a plurality of sites are placed under the management of the same owner is called the "Intranet" and which is operated for example by a company as the owner.

The network in which a plurality of sites are not placed in the same owner is called the "Extranet" and is operated, for example, by different independent companies. Moreover, the network can also be sorted from the viewpoint that with which routing domain the intranet and extranet are structured.

Namely, when one network is formed of a single routing domain, this network is called single-domain, while when the network is formed of a plurality of routing domains, this network is called multi-domain. As explained above, an example of the network structure through a combination of the single-domain/multi-domain, intranet/extranet is illustrated in FIG. 1. Like reference codes designate like or equivalent elements throughout the figures.

However, in general, it is a rare case in the Intranet that a plurality of routing domains exist within the network under the management of only one main constitution for management. Therefore, the word "intranet" in this specification suggests the intranet of single-domain.

Moreover, in the extranet, it is often thought that different relaying rule (policy) is used in the respective network placed under the management of a plurality of owners. Therefore, the wording "extranet" used in the following explanation suggests the extranet of multi-domain.

Next, FIG. 2 illustrates how a router accommodating a VPN of a single-domain and a multi-domain structure of FIG. 1 structures the relaying table. FIG. 2 illustrates an example of a structure of the relaying table of the router accommodating the intranet VPN of the single-domain structure connected via the provider. In this figure, a packet receiving unit 113 refers to a domain identification table 109 to identify a transmission source routing domain of the received packet. In case the packet is a routing packet which includes routing information, it is transmitted to an intranet domain routing information processing unit 101.

For example, when the received packet is the routing packet, having routing information, from the routing domain #11 not illustrated, an intranet domain routing information management unit 102 (left side in the figure) receives this routing packet and writes this packet to the intranet domain relaying table 104 (right side in the figure) corresponding to the VPN#11 provided corresponding to each VPN. Namely, in the FIG. 2 a packet from the routing domain #11 can be relayed only to the routing domain #11.

On the other hand, the intranet domain routing information management unit 102 (right side in the figure) corresponding to the routing domain #12 not illustrated, writes the packet data to the intranet domain relaying table 104 (left and right sides in the figure) of VPN#11 and VPN#12. Namely, the packet from the routing domain #12 can be relayed to both routing domain #11 and routing domain #12. Processes for connection and disconnection between the routing domain #11 and routing domain #12 have been conducted in cooperation with the intranet domain relaying table 104 corresponding to the intranet domain routing information management unit 102.

Here, the packet including the IP address of the transmission destination is transmitted to the packet transmitting unit 112 together with the output interface information of the packet transmitting unit 112. The packet transmitting unit 112 selects the designated output interface to transmit the packet. If the transmission destination IP address does not exist in the intranet domain relaying table 104 corresponding to VPN(s), such packet is destroyed.

Each intranet domain relaying table 104 is structured to include the transmission destination IP address, IP address mask information, output interface information and next hop router IP address or the like.

Moreover, the routing domain information in the intranet domain routing information processing unit 101 is included in the routing packet and is periodically transmitted to the packet transmitting unit 112 and the packet transmitting unit 112 distributes the routing packet to the adjacent router.

SUMMARY OF THE INVENTION

The object of the present invention is therefore to solve at least one problem among the first and second problems explained above. The present invention introduces the following structure to solve the problems explained above.

A packet relaying apparatus comprising: first means for selecting one or more transmission destination virtual private network identifiers which are allowed to relay a received packet based on a transmission source virtual private network identifier related to the received packet; second means for selecting one or more transmission destination domain identifiers corresponding to each of said one or more transmission destination virtual private network identifiers; third means for collating, using a mask, a next relaying apparatus address of the received packet with each routing information stored in one or more domain relaying means which corresponds to each of the one or more domain identifiers to select the next relaying apparatus address; and fourth means for transmitting the received packet in accordance with the next relaying apparatus address selected by the third means.

Moreover, a packet relaying method comprising: selecting one or more transmission destination virtual private network identifiers which are allowed to relay a received packet based on a transmission source virtual private network identifier related to the received packet; selecting one or more transmission destination routing domain identifiers corresponding to each of said transmission destination virtual private network identifiers; collating a next relaying apparatus address of the received packet with each routing information stored in one or more domain relaying means which corresponds to each of the one or more domain identifiers to select the next relaying apparatus address; and transmitting the received packet in accordance with the next relaying apparatus address selected by the collating step.

Moreover, a packet relaying apparatus for transmitting a received packet to a next relaying apparatus in accordance with policy, comprising: first means for managing relationship between each of one or more transmission source virtual private network identifiers and one or more transmission destination virtual private network identifiers; second means for selecting one or more transmission destination virtual private network identifiers which are allowed to relay a received packet based on a transmission source virtual private network identifier related to the received packet by referencing to the first means; and third means for sending, to the second means, a transmission source VPN identifier depending on an instruction such as a command from a terminal and receiving one or more transmission destination VPN identifiers corresponding to the transmission source VPN identifier, and displaying, on the terminal, relationship between the transmission source virtual private network identifier and the one or more destination virtual private network identifiers; wherein the received packet is transmitted to a next hop relaying apparatus of a transmission destination virtual private network allowed by the second means.

Moreover, a packet relaying apparatus for transmitting a received packet to a next relaying apparatus in accordance with policy, comprising: first means for managing relationship between each of one or more transmission source virtual private network identifiers and one or more transmission destination virtual private network identifiers; second means for selecting one or more transmission destination virtual private network identifiers which are allowed to relay a received packet based on a transmission source virtual private network identifier related to the received packet by referencing to the first means; third means for requesting, to the second means, a list of one or more transmission destination routing domains identifiers corresponding to each of one or more transmission destination virtual private network identifiers set in a domain relaying policy table based on an instruction as a command from a terminal, the instruction having one or more transmission destination virtual private network identifiers as an operand; and fourth means for extracting the one or more transmission destination routing domain identifiers from the domain relaying policy table based on the request received from the third means and extracting one or more transmission destination routing domains identifiers corresponding to each of the transmission destination virtual private network identifiers; wherein the third means displays, on the terminal, the extracted each transmission destination virtual private network identifiers and the list of the one or more transmission destination routing domains corresponding to each of the transmission destination virtual private network identifiers.

BRIEF DESCRIPTION OF THE DRAWINGS

FIG. 18 is a diagram for explaining an example of the transmission source VPN identification table for management of correspondence between the receiving interface and transmission source domain and transmission source VPN identifier in the router 1 illustrated in FIG. 16;

FIG. 19 is a diagram for explaining an example of the table format for setting the relaying policy among VPNs;

FIG. 20 is a diagram for explaining an example of the table format and setting value for setting the domain relaying policy;

FIG. 21 is a diagram for explaining an example of the relaying table format and setting values among the routing domains;

FIG. 22 is a diagram for explaining an example of the relaying table format and setting values among the routing domains; and FIG. 23 is a diagram for explaining an example of the relaying table format and setting values among the routing domains.

DESCRIPTION OF THE PREFERRED EMBODIMENT

Operation principles of the preferred embodiments of the present invention will be explained with reference to the accompanying drawings. The transmission source VPN identifier is called in some cases the virtual private network identifier, while the destination VPN identifier as the destination virtual private network identifier and the transmission destination VPN identifier as the transmission destination virtual private network identifier. Moreover, the transmission source VPN identifier is sometimes called the transmission source VPN, while the transmission destination VPN identifier as the transmission destination VPN and the routing domain as the domain.

Figure 1:
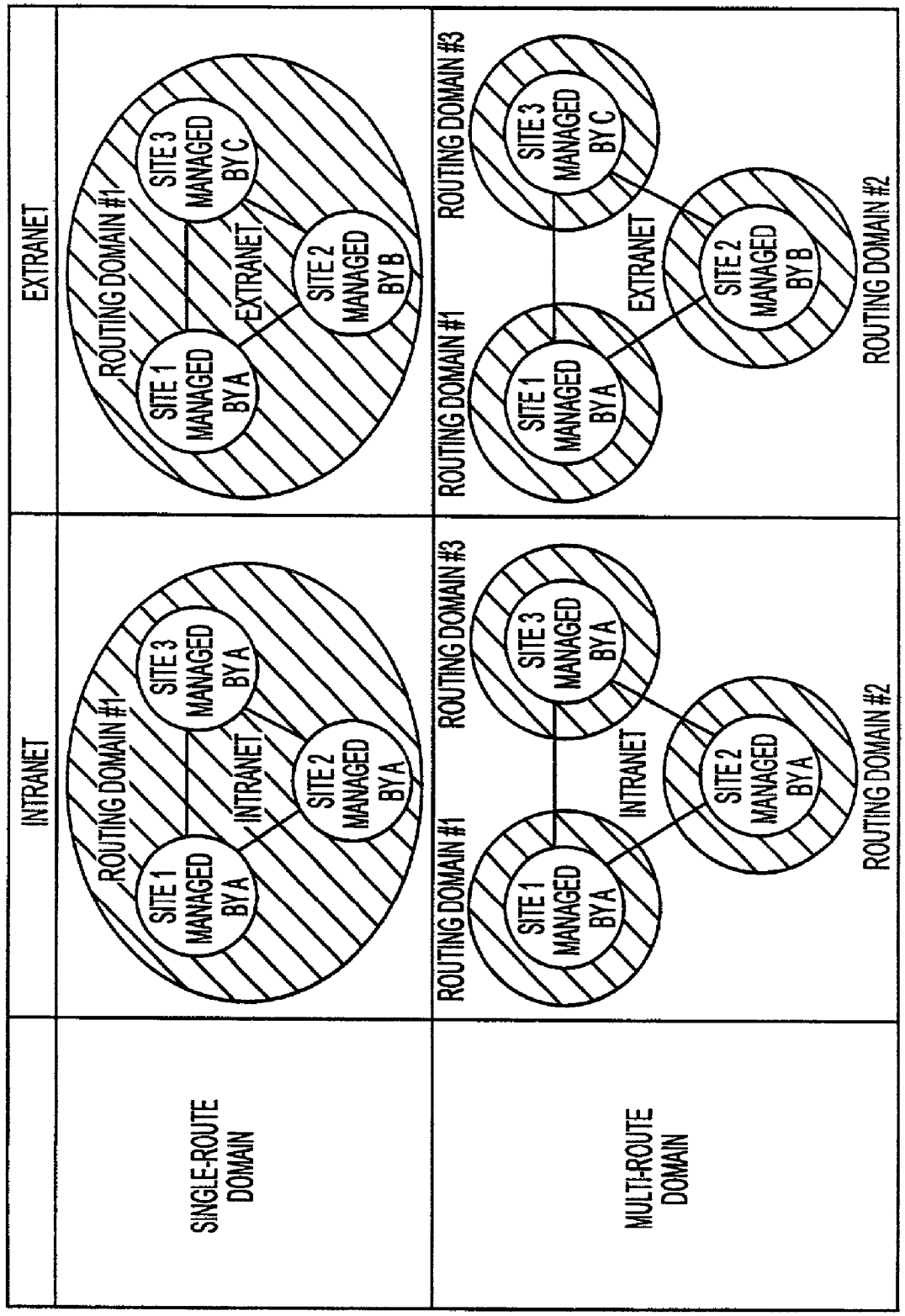
FIG. 1 is a diagram for explaining an example of the network structure depending on the combination of single-domain/multi-domain and intranet/extranet.
Figure 2:
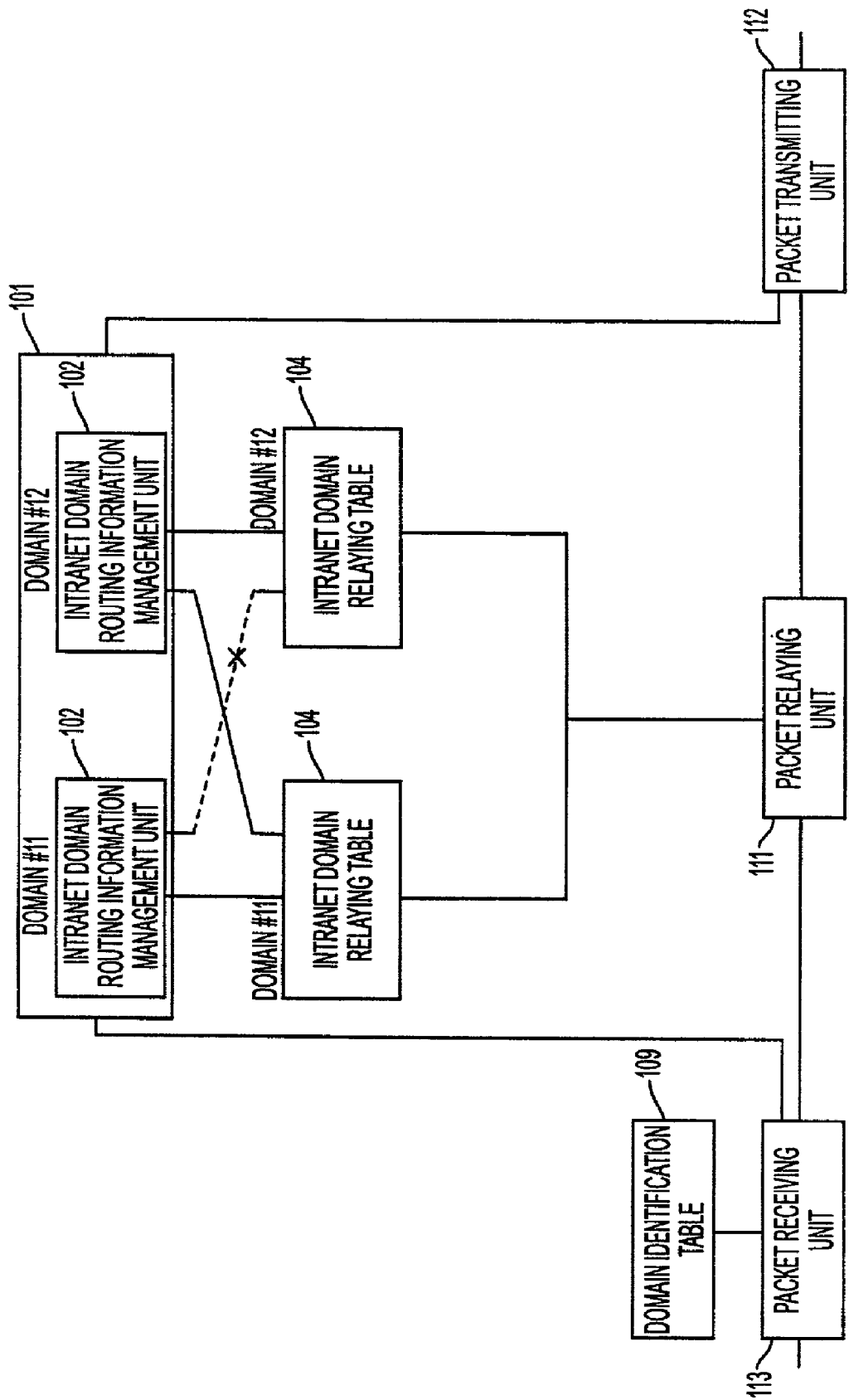
FIG. 2 is a diagram for explaining a structure example of a relaying table of the router accommodating the intranet VPN of the single-domain structure.
Figure 3:
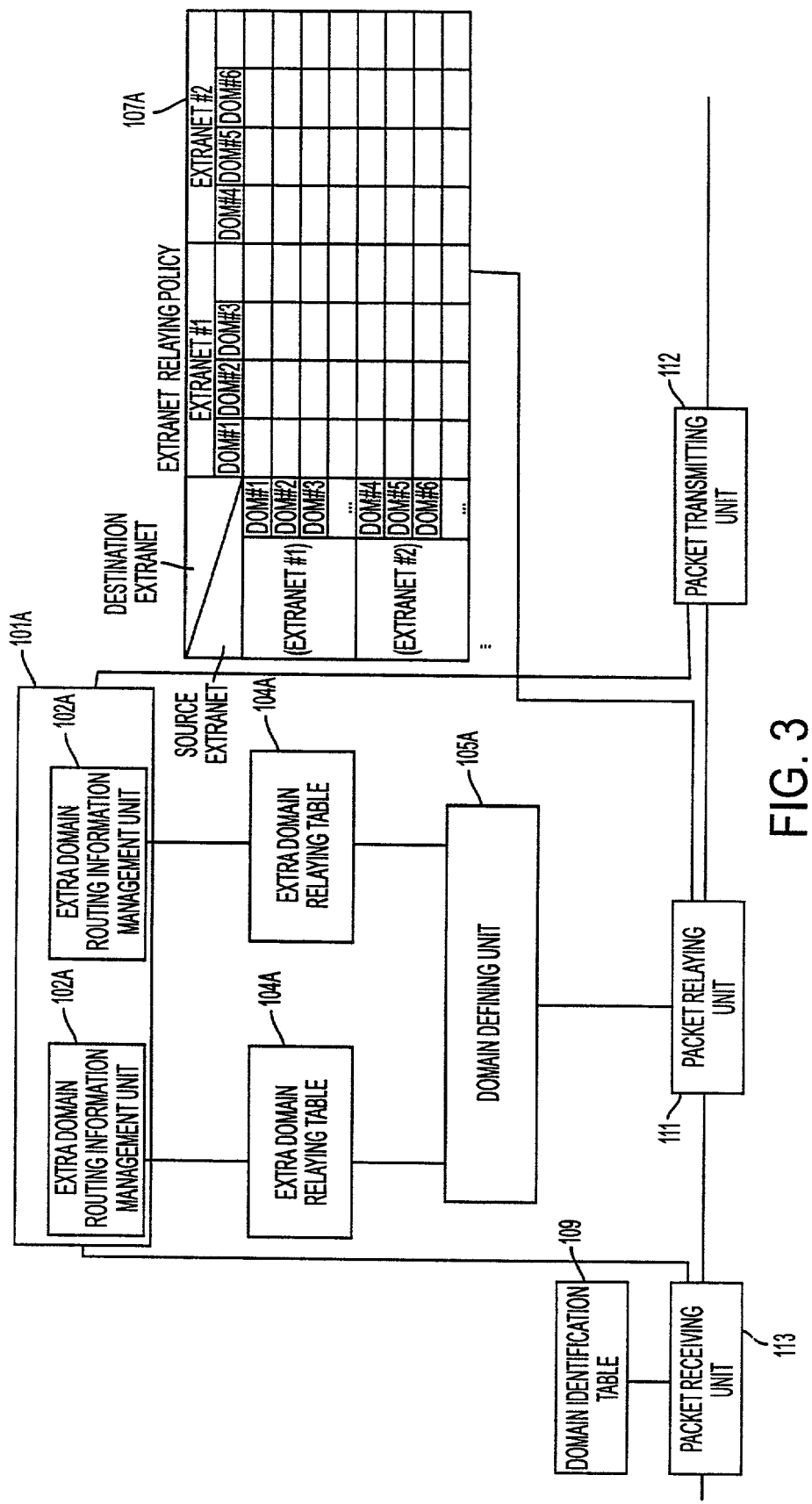
FIG. 3 is a diagram for explaining a structure example of relaying table of the router for accommodating the extranet VPN of the multi-domain structure.

FIG. 3 illustrates an example of a structure of the relaying table of a router accommodating the extranet VPN of the multi-domain structure. Essential differences between FIG. 2 and FIG. 3 are that necessary changes are made corresponding to the intranet and extranet and that the relaying policy 107A between extranets and the domain defining unit 105A are newly provided. Attention is paid to these differences for the following explanation.

In the figure, the extranet domain routing information management unit 102A of the extranet domain routing information processing unit 101A usually exits as many as the number of routing domains under the management of router. The extranet domain routing information management unit 102A corresponding to the routing domain of the transmission source receives the routing packet and writes the routing information to the extranet domain relaying table 104A corresponding to the routing domain of the packet transmission source.

Upon reception of the packet from the packet receiving unit 113, the packet relaying unit 111 searches the extranet domain relaying policy 107A corresponding to the routing domain information of the packet transmission source and searches a list of the routing domain which can relay the packet. Here, the packet relaying unit 111 calls the domain defining unit 105A using the list of routing domains obtained and the transmission destination IP address as the parameters.

The domain defining unit 105A sequentially extracts the routing domain from the list of routing domains given as the parameter, searches the extranet domain relaying table 104A corresponding to the extracted routing domain using the transmission destination IP address and obtains the IP address of the next hop router to which the packet is transferred.

The packet including the IP address of the transmission destination is transmitted to the packet transmitting unit 112 together with the output interface information of the packet transmitting unit 112. The packet transmitting unit 112 selects the designated output interface to transmit the packet.

As explained above, the packet relaying process has been accompanied by the following problems to define the relaying policy for other extranet a the same intranet formed of multi-domain as the transmission destination from the intranet VPN and extranet VPN as a certain transmission source.

In the structure of the first earlier technology, the routing information corresponding to the transmission destination VPN is written into each VPN relaying table for each transmission source routing domain. Therefore, if a plurality of transmission source VPNs try to define the connection ability to the same transmission destination VPN, the routing information of the same transmission destination VPN is copied to the relaying table for a plurality of transmission source VPN and therefore a large amount of memory area is consumed as a whole.

In the structure of the second earlier technology, it is required to individually set the relaying policy for all combinations between the domain forming the transmission destination VPN and a plurality of domains of the transmission destination VPN and thereby the setting/alteration of relaying policy is complicated.

Therefore, the first problem of the present invention is to facilitate setting/alteration of the relaying policy and the second problem thereof is to save the memory area used in the relaying apparatus.

Figure 4:
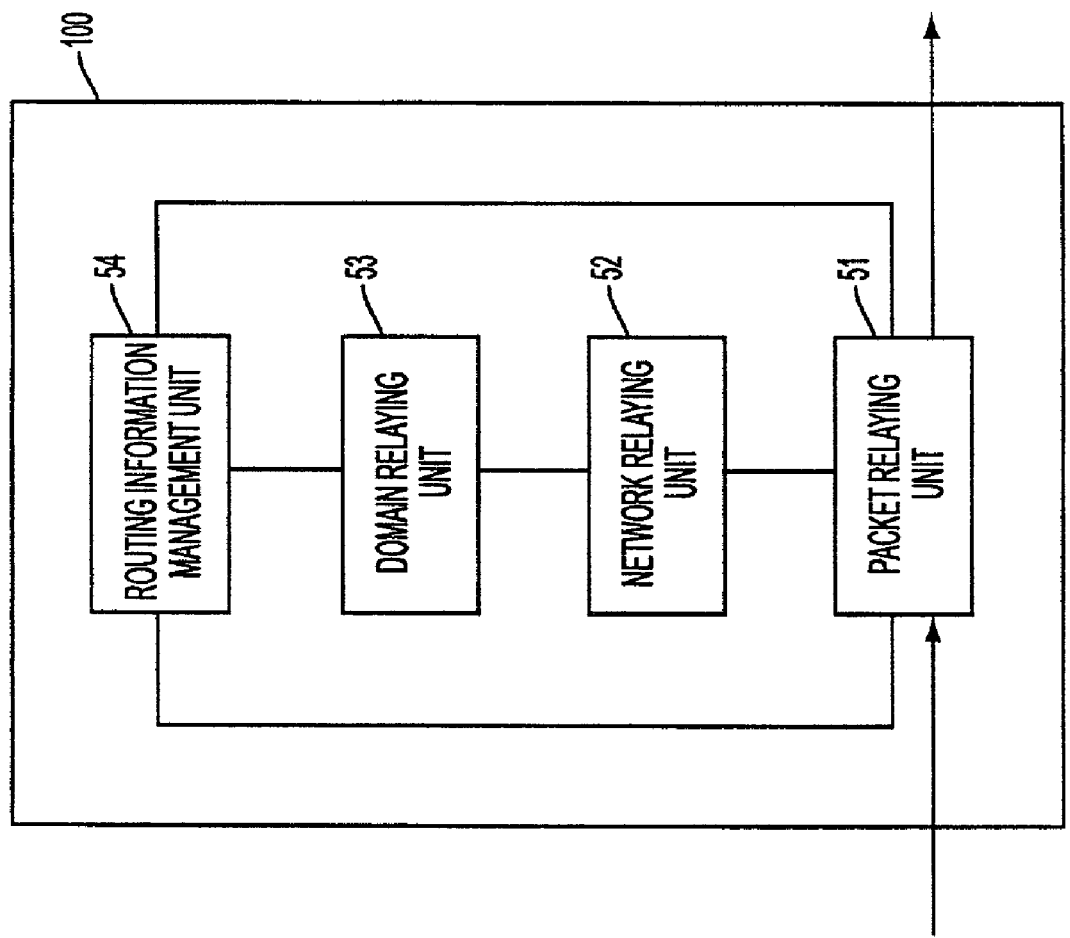
FIG. 4 is a diagram example for explaining the operation principle of the present invention.

FIG. 4 illustrates the operation principle of the relaying apparatus 100 of the present invention.

In the figure, the packet relaying unit 51 transmits the input routing packet to the routing information management units 54 and also transmits the packet as the relaying object to the desired transfer destination based on the information obtained through cooperation with the domain relaying unit 53, network relaying unit 52 and routing information management unit 54. It is also possible that the routing information is manually set to the routing information management unit 54 not depending on the routing information included in the routing packet. Moreover, the network relaying unit 52 can be intended for a virtual private network (VPN) accommodating one or more routing domains.

The network relaying unit 52 is called from the packet relaying unit 51 to receive header information and attribute information of packet as the parameter. Next, the unit 52 also searches the relayable virtual private network identifier (transmission destination VPN identifier) based on the transmission source virtual private network identifier (transmission source VPN identifier) corresponding to the packet.

Here, the domain relaying unit 53 is called. In this timing, the header information and attribute information of the packet and the relayable virtual private network identifier (transmission destination VPN identifier) are transferred as the parameter. The domain relaying unit 53 identifies the routing domain to accommodate the relayable virtual private network and obtains, based on the transmission destination IP address, the desired transfer destination IP address and output interface information or the like, or information suggesting that relaying is impossible from the routing information management unit 54. Such information is finally notified to the packet relaying unit 51. The packet relaying unit 51 transmits the packet to the desired transfer destination based on such information or destroys such packet.

First Embodiment

Figure 5:
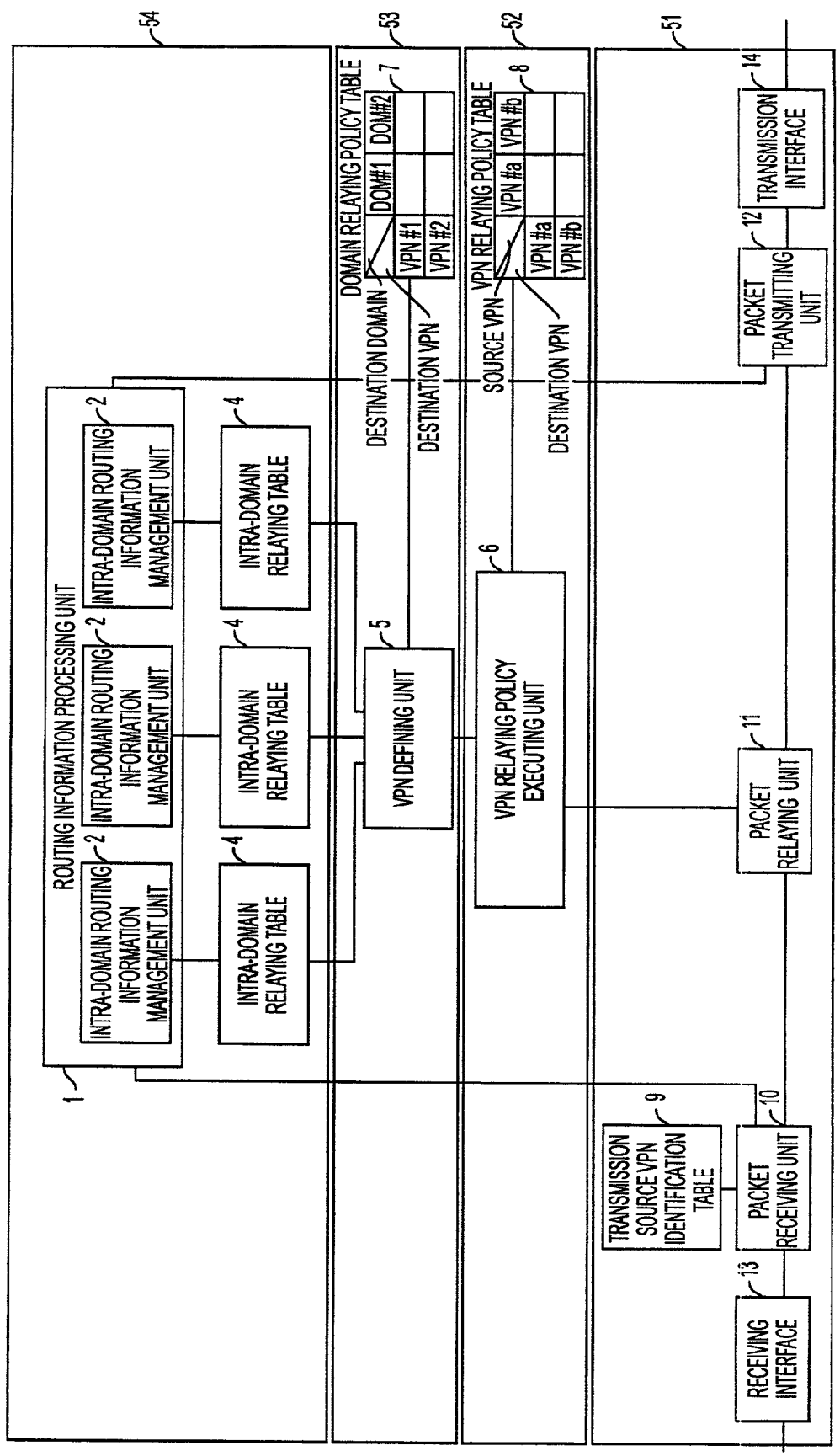
FIG. 5 is a diagram example for explaining a first embodiment of the present invention.

FIG. 5 is a diagram for explaining a first embodiment of the present invention. A receiving interface 13 receives the packet from the connected network (for example, LAN, WAN or Internet) and then transmits this packet to the packet receiving unit 10.

The transmission source VPN identification table 9 is a table (an example of the table format will be explained later) for identifying the transmission source domain of the packet and transmission source VPN received via the receiving interface 13.

The packet receiving unit 10 analyzes the transmission destination IP address preset in the header of the IP packet received from the network via the receiving interface 13 to determine whether this packet should be relayed or received by its own station (own router).

This packet receiving unit 10 searches the transmission destination VPN identification table 9 using the identifier (for example, the port number) of the receiving interface 13 having received this packet as the key to identify from which routing domain and VPN this IP packet has been received. A similar result has also been obtained using the transmission source IP address of the IP packet header as the search key by adding the transmission source IP address field to the transmission source VPN identification table 9.

The packet receiving unit 10 transmits, upon reception of the routing packet to its own terminal (for example, BGP-4 [border gateway protocol version 4] packet or the like including the routing information), this routing packet to the routing information processing unit 1. When the packet received is relayed to the other relaying apparatus, it is then transmitted to the packet relaying unit 11. The other data packet to its own terminal is similar to those who are skilled in this art and it is not explained here.

The routing information processing unit 1 includes a plurality of relaying tables 4 in the domains (intra-domain relaying tables) and such relaying tables 4 usually exist corresponding to the number of routing domains under the management of the router. The routing information processing unit 1 receives the packet including the routing information (routing information) via the packet receiving unit 10 and updates the Intra-domain relaying table 4 (an example of the table format will be explained later) corresponding to the routing domain (identified from the transmission source VPN identification table 9) belonging to its routing information.

For example, the packet receiving unit 10 identifies the routing domain of the transmission source by referring to the transmission source VPN identification table 9 from the receiving interface 13 of the received packet. Here, the identified routing domain and the received routing information are transmitted to the routing information processing unit 1.

The routing information processing unit 1 selects a corresponding intra-domain routing information management unit 2 based on the routing domain identified by packet receiving unit 10. The selected intra-domain routing information management unit 2 updates the intra-domain relaying table 4 corresponding to the routing domain information based on the routing information. The routing information set in the relaying apparatus 100 is distributed to the other relaying apparatuses (routes or the like) via the packet transmitting unit 12.

Each intra-domain relaying table 4 corresponds to the routing domain for management of the routing information required for relaying (routing) of the packets in the routing domain. This intra-domain relaying table 4 may also be structured by manual operation. When this intra-domain relaying table 4 is structured manually, the intra-domain routing information management unit 1 may be eliminated.

The packet relaying unit 11 generates, in order to obtain the information required for relaying the packet received from the packet receiving unit 10 to the other relaying apparatuses, the header information to the output packet, determines the output interface in the transmission interface 14 and transmits the output packet to the packet transmitting unit 12 through cooperation with the VPN relaying policy executing unit 6, VPN defining unit 5 and each intra-domain relaying table 4.

In more detail, the packet relaying unit 11 calls the VPN relaying policy executing unit 6 using the transmission source routing domain of the packet to be relayed, transmission source VPN identifier (transmission source virtual private network identifier) and transmission destination IP address.

The VPN relaying policy executing unit 6 conducts management of the connecting relationship (corresponding relationship) between the transmission source VPN identifier (transmission source virtual private network identifier) and the transmission destination VPN identifier and searches the VPN relaying policy table 8 using the VPN identifier and transmission destination IP address in order to obtain a list of the VPN identifiers to relay the relevant packet and the IP address information associated with each VPN identifier.

Although not illustrated, for example, in the case where the transmission source VPN identifier of the packet is VPN#1 and the VPN#1, VPN#2, VPN#4 are defined in the VPN relaying policy table 8 as the relayable VPN identifier corresponding to this VPN#1, the VPN relaying policy executing unit 6 can obtain the VPN#2, VPN#1 and VPN#4.

In this case, the VPN#2 has the highest priority and VPN#4 has the lowest priority. Moreover, when 10.100.123.0/24 is defined as the IP address associated with the VPN#1, this IP address information can also be obtained. It is also possible to prepare one or more IP address information pieces. Moreover, the logical arithmetic operators or the like such as logical product AND, logical addition OR, logical negation NOT and parentheses and/or instruction for connection (for example, permission [Permit], no-permission [Deny] or the like) may be included to the IP address information.

It means that even when if the packet, for example, can be relayed to the VPN#2, such packet cannot be relayed if the IP address information designated as the associated condition does not match the designated condition. For instance, when the destination IP address of packet is 10.10.50.50, the packet can be relayed under the condition that VPN#2 is relayable but such packet cannot be relayed depending on the IP address information designated as "10.10.50.0/24 Deny".

Next, the VPN relaying policy executing unit 6 (FIG. 5) calls the VPN defining unit 5 (FIG. 5) using the parameters such as the transmission destination IP address and transmission source routing domain received from the packet relaying unit 11, one or more transmission destination VPN identifiers obtained from the VPN relaying policy table 8 and the IP address information associated with the transmission destination VPN identifier.

The VPN defining unit 5 conducts management of the connection relationship (correspondence relationship) between the transmission destination VPN identifier and routing domain identifier and also gives priority order respectively to the intra-domain relaying table 4 by referring to the domain relaying policy table 7 corresponding to each transmission destination VPN identifier received as the parameter. Each intra-domain relaying table 4 is searched depending on the priority order using the transmission destination IP address received as the parameter. In this case, the IP address information associated with each transmission destination VPN identifier is also evaluated. As a result of this search, the IP address of the next hop router detected first, information of output interface or information for disabled relaying (the relevant information cannot be obtained as a result of search) can be obtained. It is also possible to obtain the filtering information and address conversion NAT (Network Address Translation) information as the relaying policy from the domain relaying policy table 7.

These information pieces are transferred to the packet transmitting unit 12 via the VPN relaying policy executing unit 5 and packet relaying unit 11. In this case, the packet relaying unit 11 destroys the packet when it receives the information for disabled relaying.

Upon reception of the IP address of the next hop router for transmitting this packet and the output interface information, the packet transmitting unit 12 executes replacement of header information of the packet (fitting of the transmission destination IP address or the like) using the information received from the packet relaying unit 11 and transmits the related transmission interface information (output interface or the like) to the transmission interface 14.

When the packet including the routing information from the routing information processing unit 1, the relevant packet is transmitted to the designated transmission interface 14. This technique is well known and therefore explanation of this technique is omitted here.

The transmission interface 14 transmits the packet received from the packet transmitting unit 12 to the network connected with this relaying apparatus depending on the output interface based on the transmission interface information.

As explained above, permission and no-permission of relaying of the packet can be processed easily based on the policy for permission and no-permission of connection between the transmission source VPN identifier and transmission destination VPN identifier set in the VPN relaying policy table 8 and the policy for permission and no-permission of connection between the transmission destination VPN identifier and routing domain set in the domain relaying policy table 7.

Moreover, since the domain relaying policy table 7 and the VPN relaying policy table 8 are formed in the hierarchical structure, the setting/alteration of policy can be realized easily.

Second Embodiment

Figure 6:
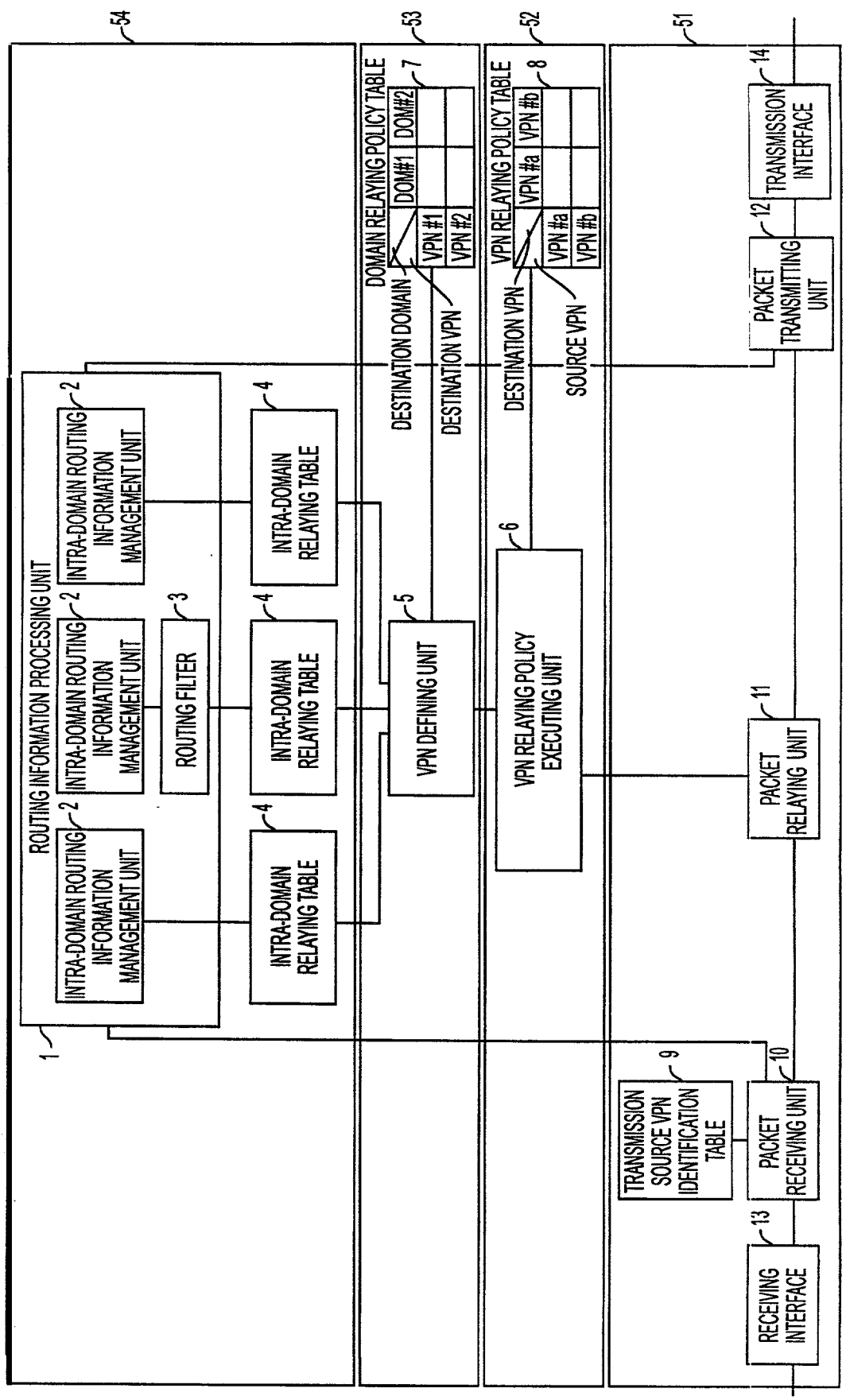
FIG. 6 is a diagram example for explaining a second embodiment the present invention.

FIG. 6 illustrates a second embodiment of the present invention. The essential difference between the first embodiment (FIG. 5) and second embodiment (FIG. 6) is that a routing filter 3 is provided in the routing information processing unit 1. The routing filter 3 is used to limit (filtering) the routing information which is set by the intra-domain routing information management unit 2 to the intra-domain relaying table 4.

For example, in the example of FIG. 6, the routing filter 3 is provided only one routing domain but it may also be provided in the routing information processing unit 1 corresponding to a plurality or all of the intra-domain routing information management unit 2.

This routing filter 3 sets the routing information to the corresponding intra-domain relaying table 4 from the intra-domain routing information management unit 2 but in this case, when the routing filter 3 is provided, only the routing information under the condition designated with this routing filter can be allowed to pass.

When 192.169.30.0/24, for example, is designated as the IP address to the routing filter 3, setting of the routing information regarding the IP address (192.169.30.* [* indicates a desired value from 0 to 255]) matched with 24 bits from the heading bit of 32 bits in total (described with addition of "/24" at the final area of the IP address) is visually inhibited or only the setting of the IP address is allowed. Thereby, only the routing information allowed with this routing filter can be set to the intra-domain routing information management unit 2.

As explained above, it is now possible, in the setting of the policy within the same domain, to set the policy through the more fine grouping of the IP addresses by grouping the IP addresses to one or more groups using the upper n-bit (heading 24 bits in above example) with the routing filter 3 for one routing domain and then executing the process such as the logical addition of such groups.

Third Embodiment

Figure 7:
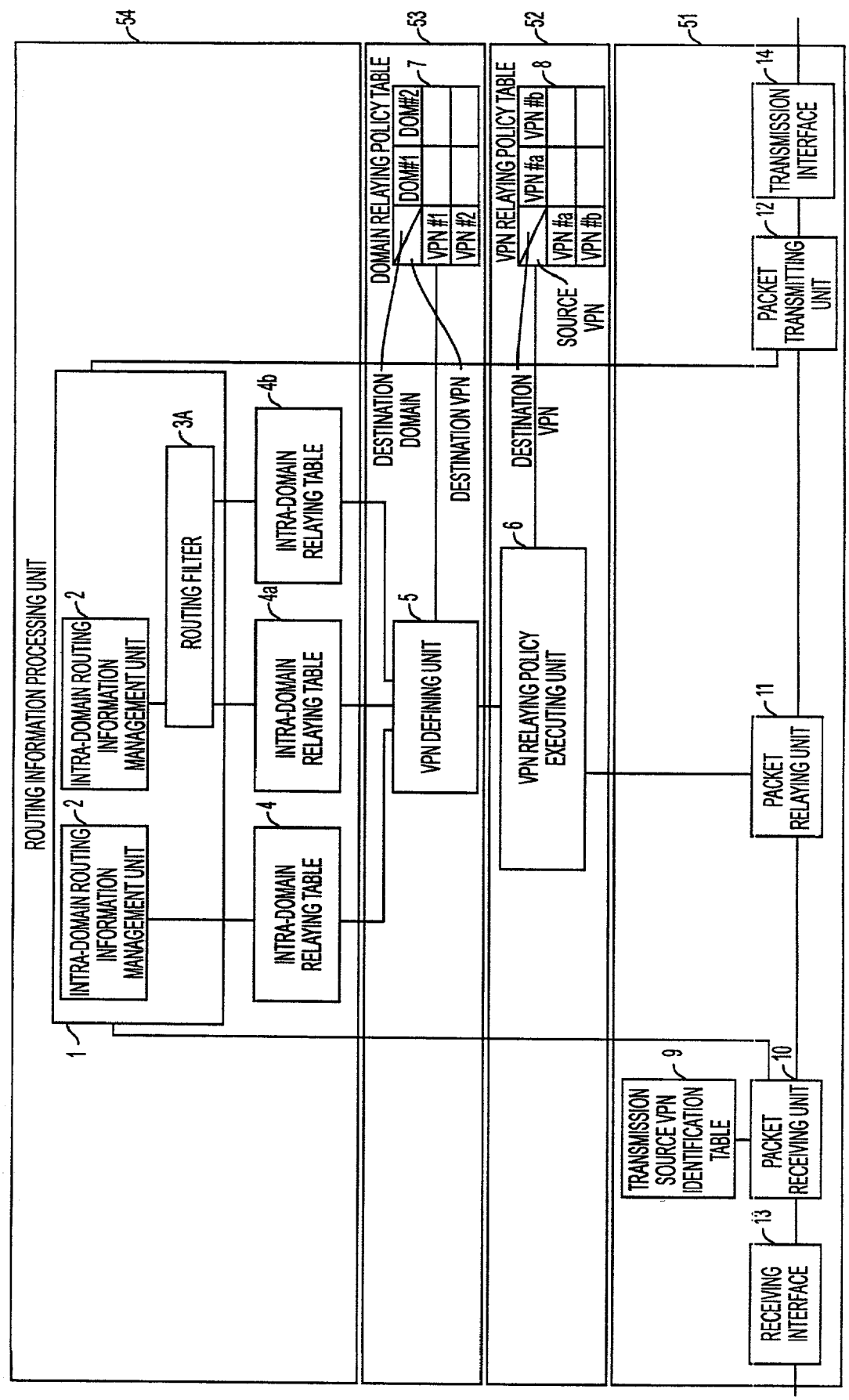
FIG. 7 is a diagram example for explaining a third embodiment of the present invention.

A third embodiment is a modification example of the second embodiment and FIG. 7 illustrates an example of the third embodiment of the present invention. The essential difference between the third embodiment (FIG. 7) and second embodiment (FIG. 6) is that the routing information can be set in the correspondence among a plurality of intra-domain relaying table 4A divided with the routing filter 3A.

Namely, on the occasion of dividing, for operation, one routing domain having a certain IP address group into two or more domains, a plurality of intra-domain relaying table 4 corresponding to the divided routing domains can be formed with less amount of job by providing the routing filter 3A to the corresponding intra-domain information management unit 2 of the routing information processing unit 1.

For example, on the occasion of dividing one routing domain to the two routing domains for starting the novel operations, it is assumed that there are two IP address groups corresponding to each divided routing domain. It is also assumed that the IP address of the first group not illustrated is 192.168.10.0/24, while the IP address of the second group as 192.168.20.0/24.

In this case, the routing information of the first group is set with the routing filter 3A to the intra-domain relaying table-4A and the routing information of the second group to the corresponding intra-domain relaying table 4B.

As explained above, when one routing domain is divided to two or more routing domains, setting of the routing information can be controlled as explained above to a plurality of corresponding intra-domain relaying table 4 in unit of the IP address group.

Fourth Embodiment

Figure 8:
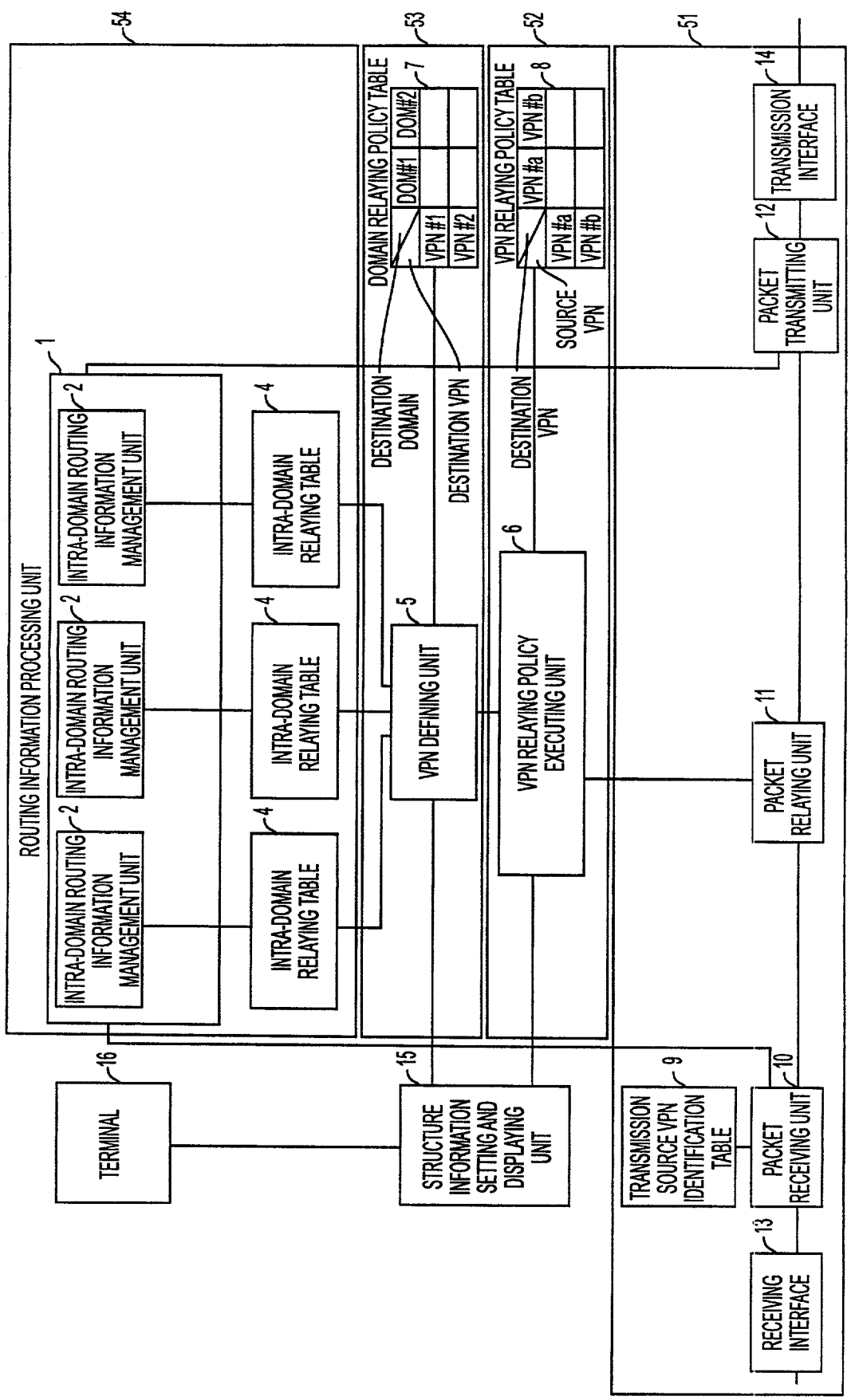
FIG. 8 is a diagram example for explaining a fourth embodiment of the present invention.

A fourth embodiment is a modification of the first embodiment. An example of the fourth embodiment of the present invention will be illustrated in FIG. 8. The essential difference between the fourth embodiment (FIG. 8) and first embodiment (FIG. 5) is cooperation of VPN defining unit 5 and structure information setting and displaying unit 15 and cooperation of VPN relaying policy executing unit 6 and structure information setting and displaying unit 15.

Namely, the information set to the domain relaying policy table 7 and VPN relaying policy table 8 based on the instruction from the terminal 16 (for example, work station or the like) connected to the structure information setting and displaying unit 15 can be displayed/updated (changed, added, deleted) based on the condition designated from the terminal 16.

This terminal 16 may be a remote terminal (for example, PC or the like) connected via a line (WAN, LAN, Internet or Telephone Line or the like).

In more detail, the structure information setting and displaying unit 15 issues, to the VPN relaying policy executing unit 6, a request for the list of each transmission source VPN identifier (transmission source virtual private network identifier) and the transmission destination VPN identifier (transmission destination virtual private network identifier) corresponding to each transmission source VPN identifier depending on the instruction such as a command or the like from the terminal 16 connected to the structure information setting and displaying unit 15.

On the basis of the request, the VPN relaying policy executing unit 6 searches all preset VPN identifiers by referring to the VPN relaying policy table 8 and transfers a list of the transmission destination VPN identifiers corresponding to each transmission source VPN identifiers (transmission source virtual private network identifiers) to the structure information setting and displaying unit 15.

Figure 9:
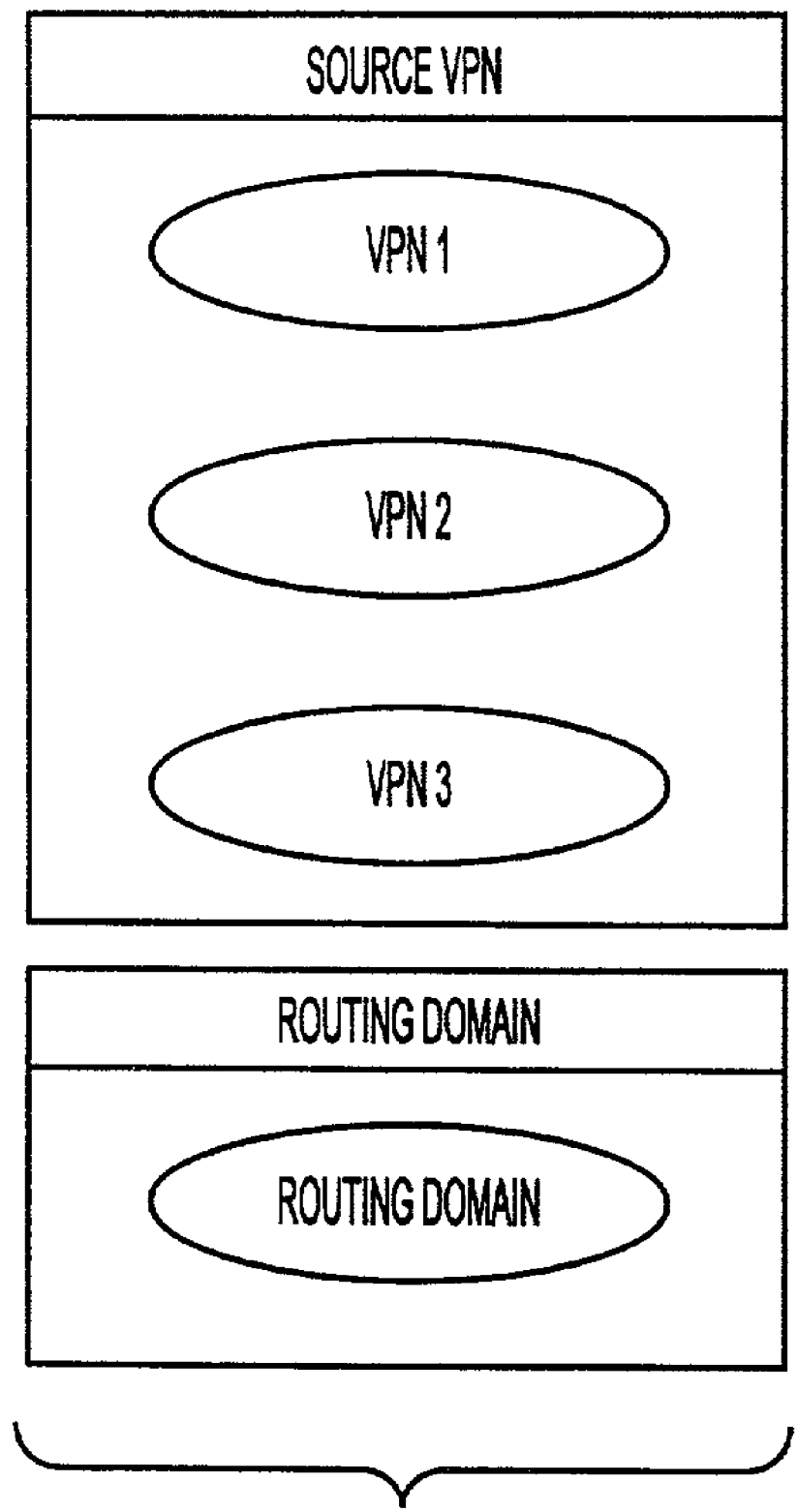
FIG. 9 is a diagram for explaining an example of a display of the transmission source VPN in the fourth embodiment of the present invention.

An example of the menu (window) indicating the list of the transmission source VPN illustrated in FIG. 9 is displayed on the terminal 16.

When the particular transmission destination VPN identifier is inputted from the display image (window) on the terminal 16, for example, when the "VPN2" is clicked as the transmission source VPN illustrated in FIG. 9, the "transmission source VPN2" is inputted to the structure information setting and displaying unit 15.

The structure information setting and displaying unit 15 requests acquisition of the information about the destination VPN (transmission destination VPN) corresponding to the transmission source VPN2 to the VPN relaying policy executing unit 6.

The VPN relaying policy executing unit 6 searches the VPN relaying policy table 8 in order to obtain the destination VPN identifier (transmission destination virtual private network identifier) corresponding to the "VPN2" which is the designated transmission source VPN identifier (transmission source virtual private network identifier) and notifies the result to the structure information setting and displaying unit 15.

When one or more destination VPN identifiers are notified as explained above, the structure information setting and displaying unit 15 issues a request, to the VPN defining unit 5, for searching the transmission destination routing domain corresponding to each destination VPN identifier. The VPN defining unit 5 searches the VPN relaying policy table 7 based on each destination VPN identifier to obtain each corresponding routing domain identifier.

Figure 10:
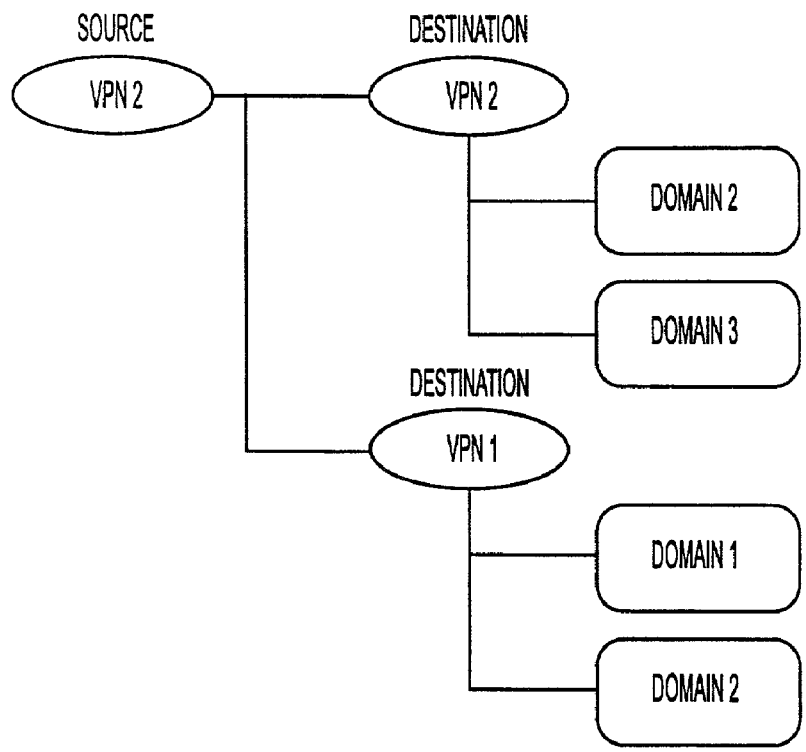
FIG. 10 is a diagram for explaining an example of the display of the correspondence between the transmission source VPN and destination VPN and destination domain in the fourth embodiment of the present invention.

The VPN defining unit 5 notifies, to the structure information setting and displaying unit 15, each destination VPN identifier and each corresponding routing domain identifier. The structure information setting and displaying unit 15 displays the transmission source VPN identifier, each destination VPN identifier corresponding thereto and each routing domain identifier corresponding to each destination VPN identifier on the display image of the terminal 16 as GUI (Graphical User Interface). A display example of the window of the display image is illustrated in FIG. 10.

In the above explanation, various information pieces are displayed on the display image on the terminal and addition, alteration and deletion for the displayed information (transmission source VPN identifier, destination VPN identifier (transmission destination VPN identifier) and transmission destination routing domain identifier) will be explained.

For example, an example of additional registration of the transmission source VPN identifier (transmission source virtual private network identifier) will be explained.

Figure 11:
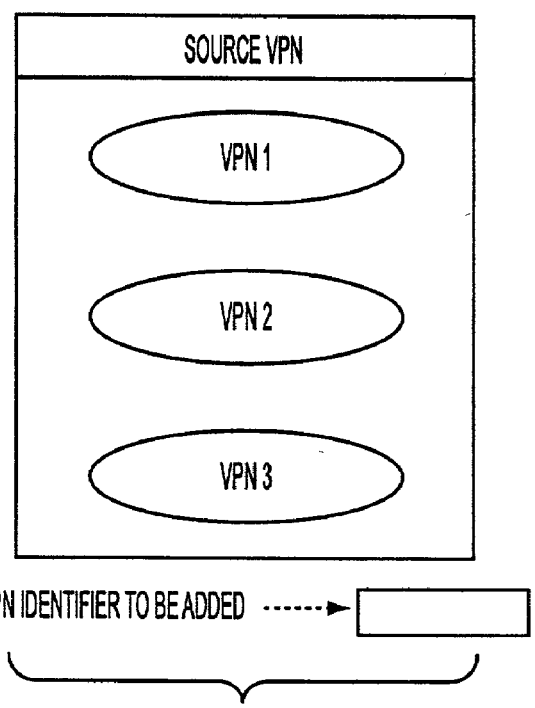
FIG. 11 is a diagram for explaining an example of the display of menu for adding the transmission source VPN in the fourth embodiment of the present invention.

Under the condition that a menu (window) of FIG. 9 is displayed in the display image of terminal 16, the key PF5, for example, among the function keys (PF1 to PF12) is depressed, an instruction for making input for additional registration of the new transmission source VPN identifier is displayed, for example, as illustrated in FIG. 11 at the lower part of the display of "VPN3".

When the transmission source VPN identifier to be additionally registered following the above instruction is inputted, the structure information setting and displaying unit 15 issues, based on this input, the request for the additional process of the transmission source VPN identifier to the VPN relaying policy executing unit 6. Thereafter, the VPN relaying policy executing unit 6 additionally registers the transmission source VPN identifier to the VPN relaying policy table 8. Here, terminal 16 enters the condition to wait for input of the next instruction.

Figure 12:
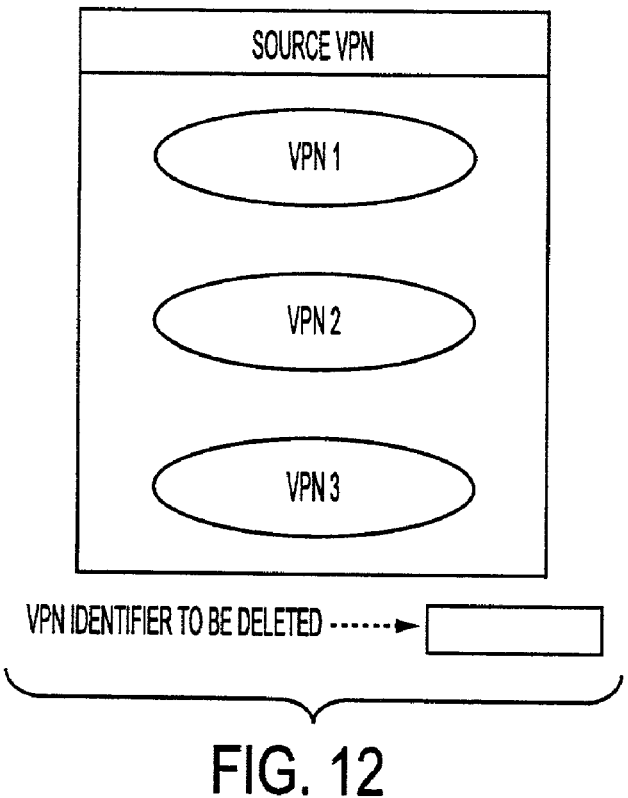
FIG. 12 is a diagram for explaining an example of the display of the menu for inputting the transmission source VPN to be deleted in the fourth embodiment of the present invention.

For the deletion of the transmission source VPN identifier, for example, the menu illustrated in FIG. 12 is displayed when the PF6 key is depressed under the condition illustrated in FIG. 9.

When the transmission source VPN identifier to be deleted is inputted, the structure information setting and displaying unit 15 requests deletion of the designated transmission source VPN identifier to the VPN relaying policy executing unit 6 based on this instruction. The VPN relaying policy executing unit 6 deletes the transmission source VPN identifier from the VPN relaying policy table 8. The terminal 16 enters the condition to wait for input of the next instruction.

Figure 13:
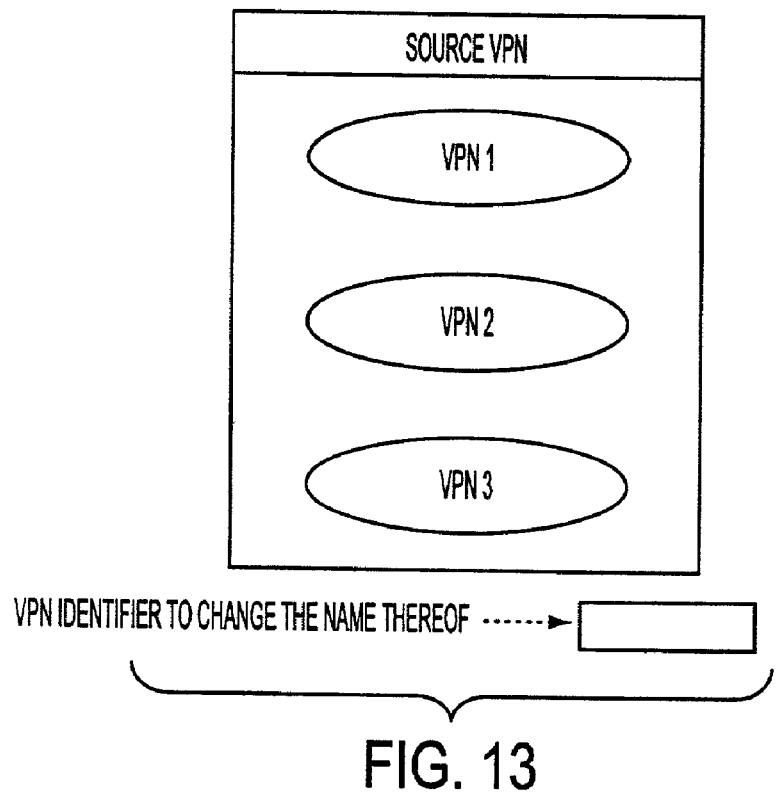
FIG. 13 is a diagram for explaining an example of the display of the menu for inputting the transmission source VPN to alter the content thereof in the fourth embodiment of the present invention.

For alteration of the transmission source VPN identifier, a cursor, for example, is positioned on the transmission source VPN identifier to be altered under the condition illustrated in FIG. 9 and the PF7 key is depressed. Thereby, a menu (window) illustrated in FIG. 13, for example, is displayed.

Moreover, when the instruction to alter the transmission source VPN identifier is inputted, the structure information setting and displaying unit 15 requests, based on this instruction, alteration of the transmission source VPN identifier to the VPN relaying policy executing unit 6 defining the current transmission source VPN identifier before alteration and the new transmission source VPN identifier after alteration as the parameters.

The structure information setting and displaying unit 15 requests, based on these parameters, the process to alter the designated current transmission source VPN identifier to the new VPN identifier to the VPN relaying policy executing unit 6. Here, the VPN relaying policy executing unit 6 alters the current transmission source VPN identifier of the VPN relaying policy table 8. Here, terminal 16 enters the condition to wait for input of the next instruction.

Here, the structure information setting and displaying unit 15 requests, upon reception of the input for addition/deletion/alteration of the destination VPN identifier (right side of FIG. 10) from the terminal 16, the process to update (add, delete or alter) the list of the designated destination VPN identifiers to the VPN relaying policy executing unit 6 based on this instruction.

Although not illustrated in the figures, the request for the process to alter these destination VPN identifiers may be issued, as explained above, by depressing the PF key 8 (addition) and PF key 9 (deletion) by placing a cursor on the destination VPN identifier as the alteration object and by using the PF key 10 (alteration) after placing the cursor on the destination VPN identifier as the alteration object. In the same manner, as explained above, the structure information setting and displaying unit 15 requests the update (addition, deletion or alteration) of the destination VPN identifier to the VPN relaying policy executing unit 6.

The VPN relaying policy executing unit 6 updates (add, delete or alter) the VPN relaying policy table 8 based on the request explained above.

Figure 14:
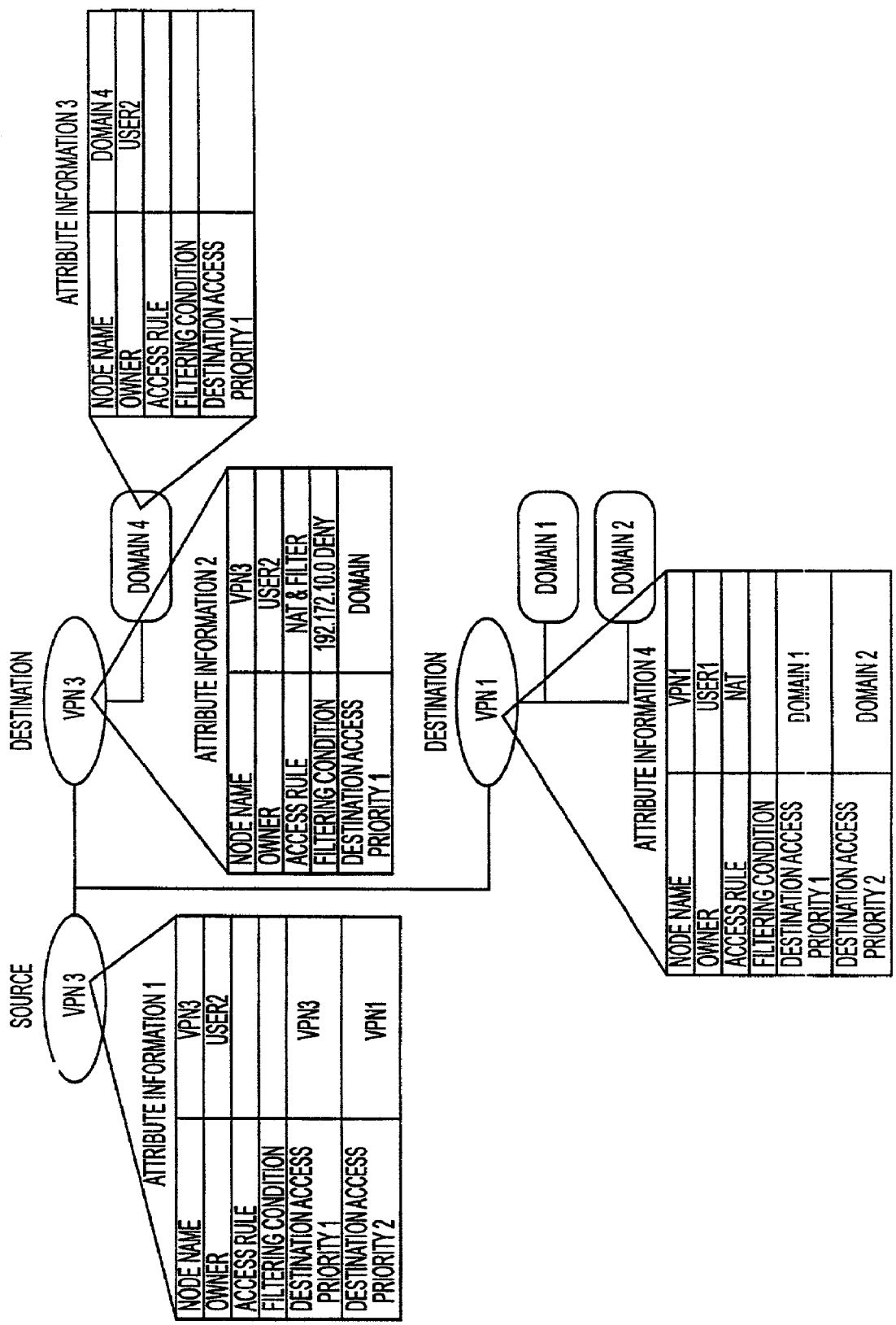
FIG. 14 is a diagram for explaining an example of the display of the VPN management information depending on the tree structure in the fourth embodiment of the present invention.

FIG. 14 illustrates an example of the information which is displayed when the transmission source VPN3 is clicked on the menu (window) illustrated in FIG. 10. The main information format is identical to that of FIG. 10. However, a difference is that the attribute information pieces 1 to 4 are displayed in FIG. 14 but such information is not displayed in FIG. 10. The attribute information pieces 1 to 4 are not displayed in the initial display image.

Regarding these attribute information pieces, when the cursor is moved to the transmission source VPN identifier or destination VPN identifier or when such identifier is clicked, the attribute information of such VPN identifier is displayed on the terminal 16.

In more detail, when the cursor is moved, for example, on the transmission source VPN identifier (VPN3), destination VPN identifier (VPN3, VPN1) and domain name (domain 4, domain 1 and domain 2) displayed on the display image of the terminal 16, it is notified to the structure information setting and displaying unit 15 that the cursor has moved to its display object.

The structure information setting and displaying unit 15 identifies the VPN identifier based on the notified information. For example, when the identified object is the transmission source VPN3, the VPN relaying policy table 8 is searched to obtain the attribute information 1 in regard to the VPN3 and the obtained attribute information 1 is displayed on the display image.

In the same manner, in the display of the attribute information 2, the structure information setting and displaying unit 15 calls the VPN defining unit 5 depending on the notified instruction using the destination VPN2 as the parameter and requests extraction of the corresponding attribute information 2. Here, the VPN defining unit 5 extracts the attribute information 2 and notifies it to the structure information setting and displaying unit 15.

The structure information setting and displaying unit 15 displays the attribute information 2 of the notified destination VPN2 to the terminal 16. An example of the display at the terminal 16 is illustrated in FIG. 14.

Moreover, when the PF1 1 key, for example, is depressed while the structure information setting and displaying unit 15 displays the attribute information 2 on the terminal 16, it is now possible to update the attribute information 2 being displayed.

Each item of the displayed attribute information 2 can be altered with over-writing. For example, the "domain 4" is displayed in the right side of the destination access priority 1, but the "domain 4" can be changed to the "domain 3" by re-setting (typing in) the "domain 4" to the "domain 3".

Moreover, when the displayed "domain 4" is deleted or it is over-written with a blank, the "domain 4" is defected.

Moreover, when the PF12 key is depressed, a new input field appears under the "domain 4" and thereby it is possible to input the transmission destination routing domain to be additionally registered. When "domain 5", for example, is inputted to this input field, the "domain 5" can be additionally registered to the "domain 4" which is already set.

In the same manner, it is also possible to alter each field value of the Owner, access rule and filter condition.

Moreover, edition (addition, deletion or alteration) of the transmission destination routing domain is assumed from the display image (window) of the terminal 16. For example, when the "domain 4" under the control of the destination VPN 3 displayed on the window of the terminal 16, the "domain 4 of the destination VPN3" is inputted to the structure information setting and displaying unit 15.

The structure information setting and displaying unit 15 requests acquisition of the attribute information 3 to the VPN defining unit 5 using the "domain 4 of the destination VPN3" as the parameter. The VPN defining unit 5 acquires the destination VPN 3 as the transmission destination VPN identifier and attribute information 3 of the domain 4 from the domain relaying policy table 7 and notifies these data to the structure information setting and displaying unit 15.

The structure information setting and displaying unit 15 displays the notified attribute information 3 to the terminal 16. An example of the display is illustrated at the upper right of FIG. 14.

Figure 15:
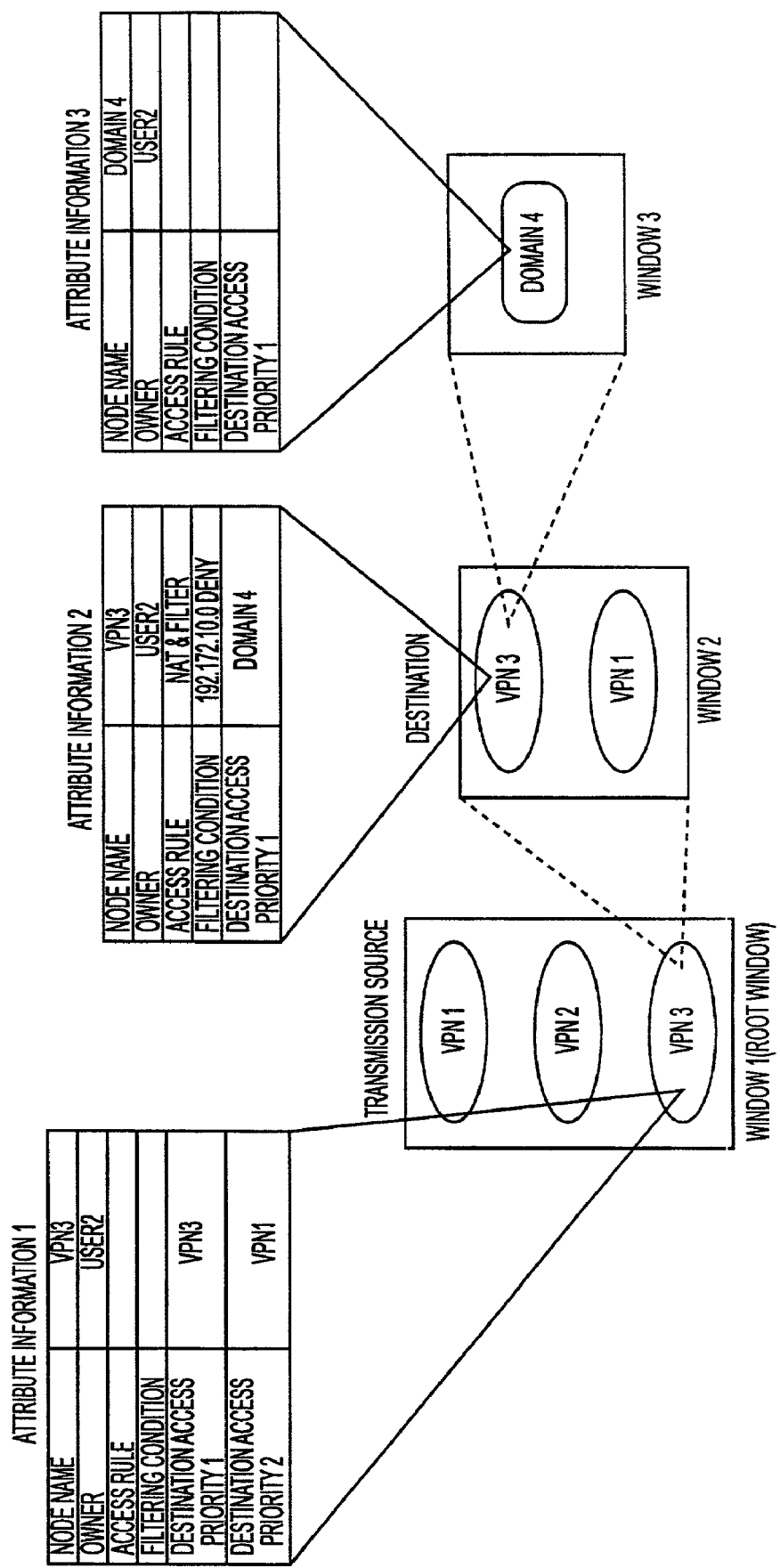
FIG. 15 is a diagram for explaining an example of the display of the VPN management information depending on the multi-window in the fourth embodiment of the present invention.

FIG. 15 apparently illustrates that the information (transmission source VPN identifier, transmission destination VPN identifier, routing domain identifier) regarding the transmission source VPN identifier can be acquired with the procedures already explained above. Therefore, a method of displaying such information will be explained with reference to FIG. 15.

In the figure, three windows are displayed and the window 1 is the root window of the display content same as the display content illustrated in FIG. 9. The window 2 is newly displayed with the left-click of the display object (VPN3 in this figure) of the transmission source VPN identifier displayed in the window 1. Meanwhile, the attribute information 1 is displayed with the right-click.

The attribute information 2 is displayed with the right-click of the display object (destination VPN3 at the upper stage of the figure) while the window 2 is displayed. On the other hand, the window 3 is newly displayed with the left-click and the routing domain 4 corresponding to the destination VPN3 is displayed in the window.

The attribute information 3 is displayed with the right-click of the routing domain 4 of the window 3.

The preset information in relation to the transmission source VPN can easily be confirmed with the hierarchical display of the relationship of the transmission source VPN identifier, destination VPN identifier (transmission destination VPN identifier) and destination (transmission destination) routing domain identifier on the terminal 16, for example, like the window 1 to window 3 as explained above.

Particularly, the information corresponding to the hierarchical transmission source VPN identifier can be displayed on the display image of the terminal as visually arranged information. When there are many information pieces, one window (logical image) is divided into a plurality of physical display images (display image of terminal) and each display image is displayed as one image or these images are continuously displayed as a moving image through the scroll function in view of easily detecting the entire information content.

As explained above, the present information can easily be confirmed by displaying/updating, on terminal 16, the information of the domain relaying policy table 7 and VPN relaying policy table 8. Moreover, when it is requested to alter the confirmed preset information, such information can be altered, added and deleted easily while confirming the value of information.

Fifth Embodiment

Figure 16:
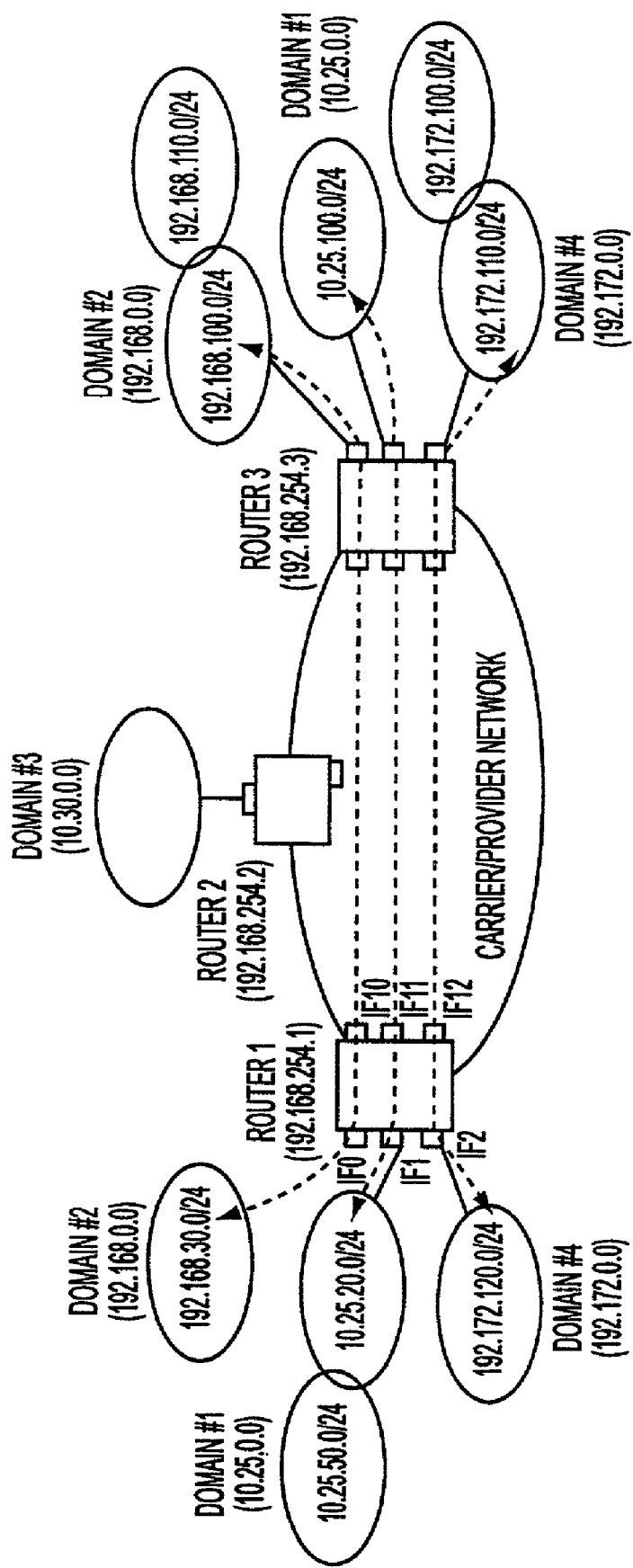
FIG. 16 is a diagram for explaining an example of employment of the router to which the first embodiment of the present invention is adapted into the network provided with the provider.
Figure 17:
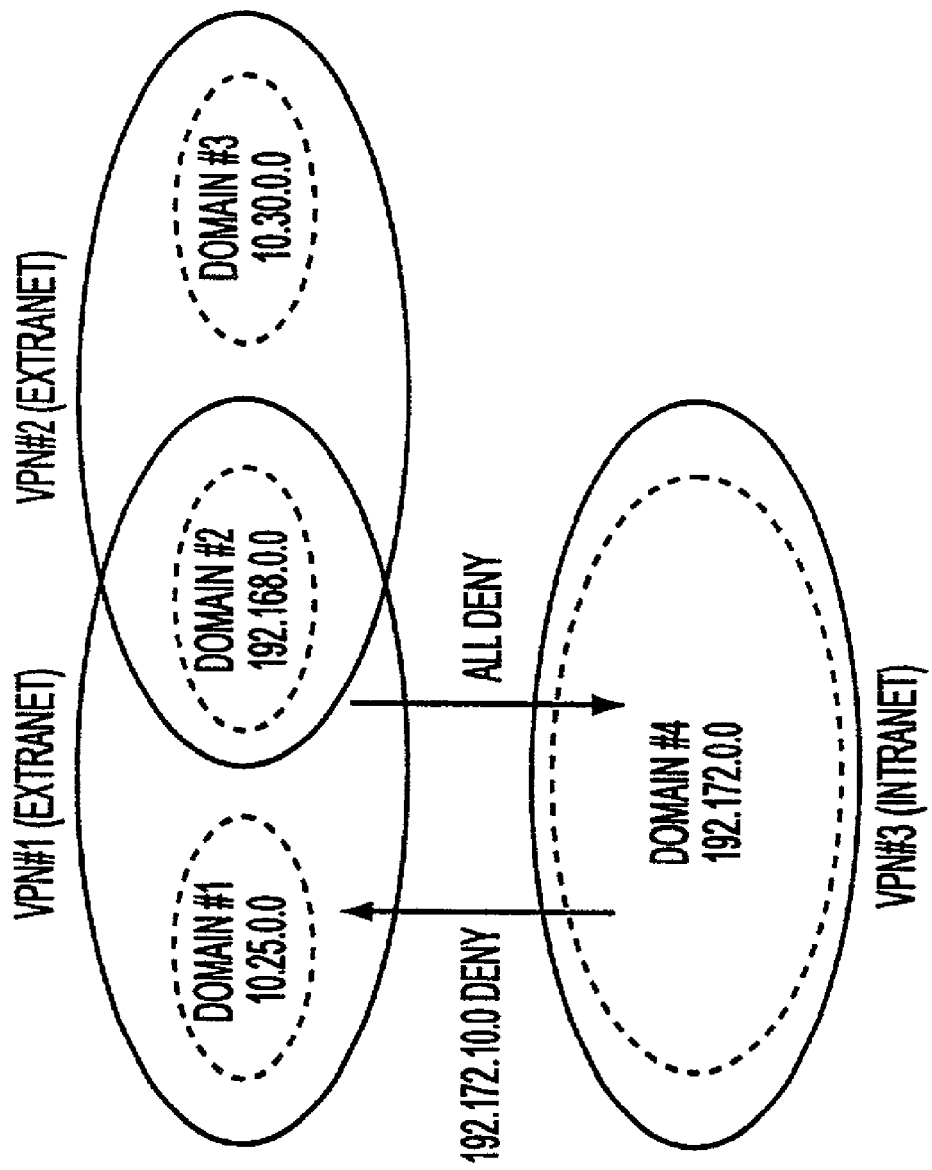
FIG. 17 is a diagram for explaining the domain structure of the network illustrated in FIG. 16.

FIG. 16 is a diagram for explaining an example where the router to which the first embodiment is adapted is introduced into the network provided with the Internet service provider. In this embodiment, in the case where a VPN service similar to the VPN service provided with the provider is provided with a carrier, such carrier is assumed to be included in the provider. FIG. 17 is a diagram for explaining a domain structure of the network illustrated in FIG. 16.

FIG. 18 is a diagram for explaining an example of the transmission source VPN identification table 9 used for management of the correspondence among the receiving interface, transmission source domain and transmission source VPN in the router 1 illustrated in FIG. 16.

FIG. 19 is a diagram for explaining an example of the table format for setting the VPN relaying policy.

FIG. 20 is a diagram for explaining examples of table format and setting values for setting the domain relaying policy. FIG. 21, FIG. 22 and FIG. 23 are diagrams for explaining examples of the relaying table format in the routing domain and setting values.

With reference to FIG. 16 to FIG. 23, operation examples of the router to which the present invention is adapted will be explained.

The network for providing the VPN services with the provider network illustrated in FIG. 16 includes four routing domains (domain #1 to domain #4) and three routers (router 1 to router 3).

Operation example of the router 1 to which the present invention is adapted will be explained by paying attention to the router 1 (IP address is 192.168.254.1) used for management of the domains #1, #2 and #4. It is not required to adapt the present invention to the router 2 or router 3 but it is naturally allowed to adapt the present invention thereto. General operation of the router 1 for providing the VPN service will be explained first and the process for permission and no-permission of connection between the VPNs and routing domains will be explained later.

The router 1 is provided with the intra-domain relaying table corresponding to each routing domain to be accommodated for individual management thereof. An example of the format of the intra-domain relaying table 4 formed corresponding to the routing domains #1, #2, #4 are illustrated in FIG. 21 to FIG. 23.

Upon reception of packets from the receiving interfaces IF0 to IF2 (FIG. 16), the router 1 refers to the transmission source VPN identification table 9 (FIG. 18) for each packet, searches the routing domain to which the receiving packet belongs and refers to the intra-domain relaying table 4 (FIG. 21 to FIG. 23) corresponding to such routing domain to obtain the IP address and output interface of the next hop router to be relayed next. The header of such packet is generated and it is then transmitted to the next hop router from any one selected from the output interfaces IF10 to IF12 (FIG. 16).

For example, when the router 1 receives, from the receiving interface IF0 (FIG. 16), the data packet having the transmission destination IP address 192.168.100.10 (route domain #2, VPN#1), it refers to the transmission source VPN identification table 9 (FIG. 18) to identify that the packet received from the receiving interface IFO (FIG. 16) belongs to the domain #2 and the transmission source VPN identifier is VPN#1.

Next, the router 1 searches, the VPN#1 which is the VPN which may be relayed from the transmission source VPN identifier from the VPN relaying policy table 8.

Next, connection ability between VPN#1 and routing domain is searched. Namely, the domain relaying policy table 7 (FIG. 20) is searched using the VPN#1 as the search key. As a result, the overlapped information is deleted and the domain #1 and domain #2 can be obtained.

Next, using the transmission destination IP address (192.168.100.10) as the key, the intra-domain relaying tables 4 (FIG. 21, FIG. 22) corresponding to the domain #1 and domain #2 are searched depending on the priority order. This search may be conducted in parallel using a plurality of processors. The next hop router address detected first as a result of this search is employed.

The IP address 192.168.254.3 of the next hop router and output interface IF10 are obtained from the intra-domain relaying table 4 (FIG. 22) of the routing domain 2. Namely, this packet can be relayed.

This packet is then transmitted to the router 3 (192.168.254.3) as the next hop router.

Moreover, in this embodiment, it is assumed that the provider defines connection ability as illustrated in FIG. 17, namely permission/no-permission for connection among the routing domains illustrated in FIG. 16. The routing domain #1 (10.25.0.0) and the routing domain #2 (192.168.0.0) mutually have the connection ability as the VPN#1 and form the extranet via the provider network. Moreover, the routing domain #2 (192.168.0.0) and the routing domain #3 (10.30.0.0) mutually have the connection ability as the VPN#2 and form the extranet via the provider network.

The routing domain #1 (10.25.0.0) and routing domain #3 (10.30.0.0) are not provided with the defined connection ability for assuring mutual communication. Moreover, the routing domain #4 (192.172.0.0) is formed of single routing domain to structure the VPN#3 as the intranet.

In the network explained above, it is assumed that the VPN relaying policy (filter condition, address conversion process or the like) between the VPN#1 (extranet connection of routing domains # 1 and #2) and the VPN#3 (intranet connection of routing domain #4). Here, the address conversion process means the process that the local IP address and global IP address are mutually converted in the intranet when the local IP address used only in the intranet is individually assigned for operation and the packet is transmitted/received between the intranet and Internet. This address conversion is already specified with RFC 1631 or the like standardized with the IETF (Internet Engineering Task Force). Details of this address conversion are apparent from such standardization.

Next, FIG. 19 is a diagram for explaining the setting example of the relaying policy among VPN#1 to VPN#3 in the router 1. According to this figure, when the router has received the packet from VPN#1, the VPN#1 can relay the packet to the VPN#1 without any condition but cannot relay the packet the other VPNs (for example, VPN#3 or the like).

Meanwhile, the router 1 which has received the packet from VPN#3 is capable of relaying the packet without any condition to VPN#3. However, when the transmission destination is VPN#1, the packet having the transmission destination address 192.172.10.0/24 is eliminated with the filter process.

First, it is assumed that the relaying policy among domains forming VPN#1 and VPN#3 is set as illustrated in FIG. 20. According to this setting, VPN#1 has the connection ability between domain # 1 and domain #2 and the relaying is permitted to any domain without any condition. In this case, reference is made to the intra-domain relaying table by giving the higher priority order to the domain #1 than the domain #2.

Moreover, in regard to VPN#3, it is indicated that it is formed of only the domain #4 (connection between the IF2 of router 1 and IF2 of router 2) and packet in the domain #4 can be relayed without any condition.

As explained above, the provider can provide the VPN services to the end users by adapting, to the provider network, the router to which the first embodiment is adapted.

Effect of the Invention: According to the present invention, a plurality of routing domains are grouped and thereby the relaying policy among the groups can be defined on the occasion of defining the relaying policy among a plurality of routing domains. Thereby, the number of relaying policies to be defined can be reduced and setting/alteration can be realized easily.

Moreover, a size of the relaying table for storing the routing information required for relaying can be reduced.

What is claimed is:

1. A packet relaying apparatus comprising:
   first means for selecting one or more transmission destination virtual private network identifiers which are allowed to relay a received packet based on a transmission source virtual private network identifier related to the received packet;
   second means for selecting one or more transmission destination domain identifiers corresponding to each of said one or more transmission destination virtual private network identifiers, the one or more transmission destination domain identifiers corresponding to a plurality of destination addresses and masks, at least one of the destination domain identifiers corresponding to a plurality of destination addresses and masks that are commonly used for the packet relaying apparatus and another packet relaying apparatus that are connected by a virtual private network;
   third means for collating, using a mask, a next relaying apparatus address of the received packet with each routing information stored in one or more domain relaying means which corresponds to each of the one or more domain identifiers to select the next relaying apparatus address; and
   fourth means for transmitting the received packet in accordance with the next relaying apparatus address selected by the third means.

2. The packet relaying apparatus according to claim 1, wherein the first means selects one or more transmission destination virtual private network identifiers which are allowed to relay a received packet based on a transmission source virtual private network identifier corresponding to a receiving interface from which the received packet has been received.

3. The packet relaying apparatus according to claim 1, wherein the first means selects one or more transmission destination virtual private network identifiers which are allowed to relay a received packet based on a transmission source virtual private network identifier corresponding to an Internet Protocol address of the received packet.

4. The packet relaying apparatus according to claim 1, wherein the first means selects, in accordance with priority order, one or more transmission destination virtual private network identifiers which have the priority order respectively and are allowed to relay a received packet based on the transmission source virtual private network identifier related to the received packet.

5. The packet relaying apparatus according to claim 1, wherein the second means selects, in accordance with priority order, one or more transmission destination domain identifiers having priority order respectively, corresponding to each of the one or more transmission destination virtual private network identifiers.

6. The packet relaying apparatus according to claim 1, wherein the first means further comprises a routing filter for filtering routing information to set the routing information selected with the routing filter to a domain relaying table.

7. The packet relaying apparatus according to claim 1, wherein the first means further comprises a routing filter for filtering the routing information to update one of at least two domain relaying tables;
   wherein the routing filter sets the routing information to said one of at least two domain relaying tables selected by the routing filter.

8. A packet relaying method comprising:
   selecting one or more transmission destination virtual private network identifiers which are allowed to relay a received packet based on a transmission source virtual private network identifier related to the received packet;
   selecting one or more transmission destination routing domain identifiers corresponding to each of said transmission destination virtual private network identifiers, the one or more transmission destination domain identifiers corresponding to a plurality of destination addresses and masks, at least one of the destination domain identifiers corresponding to a plurality of destination addresses and masks that are commonly used for the packet relaying apparatus and another packet relaying apparatus that are connected by a virtual private network;
   collating a next relaying apparatus address of the received packet with each routing information stored in one or more domain relaying means which correspond to each of the one or more domain identifiers to select the next relaying apparatus address; and
   transmitting the received packet in accordance with the next relaying apparatus address selected by the collating step.

9. A packet relaying apparatus for transmitting a received packet to a next relaying apparatus in accordance with policy, comprising:

a packet receiving unit identifying a transmission source virtual private network identifier corresponding to a receiving interface identifier of a receiving interface from which the received packet has been received;

first means for managing relationship between each of one or more transmission source virtual private network identifiers and one or more transmission destination virtual private network identifiers;

second means for selecting one or more transmission destination virtual private network identifiers which are allowed to relay a received packet based on said transmission source virtual private network identifier identified by the packet receiving unit; and third means for sending, to the second means, a transmission source virtual private network identifier depending on an instruction such as a command from a terminal and receiving one or more transmission destination virtual private network identifiers corresponding to the transmission source virtual private network identifier, and displaying, on the terminal, relationship between the transmission source virtual private network identifier and the one or more destination virtual private network identifiers, wherein the received packet is transmitted to a next hop relaying apparatus of a transmission destination virtual private network allowed by the second means.

10. The packet relaying apparatus according to claim 9, wherein the first means further comprises a table for storing a relationship between a transmission source virtual private network identifier and one or more transmission destination virtual private network identifiers.

11. The packet relaying apparatus according to claim 9, wherein the third means receives, from the terminal, a transmission source virtual private network identifier and corresponding one or more transmission destination virtual private network identifiers to be additionally registered, and requests additional registration to the second means, and the second means registers the transmission source virtual private network identifier and the corresponding one or more transmission destination virtual private network identifiers into the first means.

12. The packet relaying apparatus according to claim 9, wherein the third means requests deletion of a transmission source virtual private network identifier to be deleted which is received from the terminal to the second means and the second means deletes the transmission source virtual private network identifier.

13. The packet apparatus according to claim 9, wherein the third means requests, to the second means, alteration of a name of a transmission source virtual private network identifier requested to change the name which is received from the terminal and a new transmission source virtual private network identifier and the second means alters the name of the transmission source virtual private network identifier to the new transmission source virtual private network identifier.

14. A packet relaying apparatus for transmitting a received packet to a next relaying apparatus in accordance with policy, comprising:

first means for managing relationship between each of one or more transmission source virtual private network identifiers and one or more transmission destination virtual private network identifiers;

second means for selecting one or more transmission destination virtual private network identifiers which are allowed to relay a received packet based on a transmission source virtual private network identifier related to the received packet by referencing to the first means;

third means for requesting, to the second means, a list of one or more transmission destination routing domains identifiers corresponding to each of one or more transmission destination virtual private network identifiers set in a domain relaying policy table based on an instruction as a command from a terminal, the instruction having one or more transmission destination virtual private network identifiers as an operand; and fourth means for extracting the one or more transmission destination routing domain identifiers from the domain relaying policy table based on the request received from the third means and extracting one or more transmission destination routing domains identifiers corresponding to each of the transmission destination virtual private network identifiers;

wherein the third means displays, on the terminal, the extracted each transmission destination virtual private network identifiers and the list of the one or more transmission destination routing domains corresponding to each of the transmission destination virtual private network identifiers.

15. A packet relaying apparatus comprising:

a network relaying unit selecting one or more transmission destination virtual private network identifiers which are allowed to relay a received packet based on a transmission source virtual private network identifier related to the received packet;

a domain replaying unit selecting one or more transmission destination domain identifiers corresponding to each of said one or more transmission destination virtual private network identifiers, the one or more transmission destination domain identifiers corresponding to a plurality of destination addresses and masks, at least one of the destination domain identifiers corresponding to a plurality of destination addresses and masks that are commonly used for the packet relaying apparatus and another packet relaying apparatus that are connected by a virtual private network;

a routing information management unit collating, using a mask, a next relaying apparatus address of the received packet with each routing information stored in one or more domain relaying tables which corresponds to each of the one or more domain identifiers to select the next relaying apparatus address; and a packet relaying unit transmitting the received packet in accordance with the next relaying apparatus address selected by the routing information management unit.

16. The packet relaying apparatus according to claim 15, wherein the network relaying unit selects one or more transmission destination virtual private network identifiers which are allowed to relay a received packet based on a transmission source virtual private network identifier corresponding to a receiving interface from which the received packet has been received.

17. The packet relaying apparatus according to claim 15, wherein the network relaying unit selects one or more transmission destination virtual private network identifiers which are allowed to relay a received packet based on a transmission source virtual private network identifier corresponding to an Internet Protocol address of the received packet.

18. The packet relaying apparatus according to claim 15, wherein the network relaying unit selects, in accordance with priority order, one or more transmission destination virtual private network identifiers which have the priority order respectively and are allowed to relay a received packet based on the transmission source virtual private network identifier related to the received packet.

19. The packet relaying apparatus according to claim 15, wherein the routing information management unit selects, in accordance with priority order, one or more transmission destination domain identifiers having priority order respectively, corresponding to each of the one or more transmission destination virtual private network identifiers.

20. The packet relaying apparatus according to claim 15, wherein the network relaying unit further comprises a routing filter for filtering routing information to set the routing information selected with the routing filter to a domain relaying table.

21. The packet relaying apparatus according to claim 15, wherein the network relaying unit further comprises a routing filter for filtering the routing information to update one of at least two domain relaying tables;

wherein the routing filter sets the routing information to said one of at least two domain relaying tables selected by the routing filter.

* * * * *